United States Patent
Takahashi

(10) Patent No.: US 9,900,595 B2
(45) Date of Patent: Feb. 20, 2018

(54) ENCODING DEVICE, ENCODING METHOD, DECODING DEVICE, AND DECODING METHOD

(75) Inventor: Yoshitomo Takahashi, Kanagawa (JP)

(73) Assignee: Sony Corporation, Tokyo (JP)

( * ) Notice: Subject to any disclaimer, the term of this patent is extended or adjusted under 35 U.S.C. 154(b) by 419 days.

(21) Appl. No.: 14/239,581

(22) PCT Filed: Aug. 21, 2012

(86) PCT No.: PCT/JP2012/071028
§ 371 (c)(1),
(2), (4) Date: Feb. 19, 2014

(87) PCT Pub. No.: WO2013/031573
PCT Pub. Date: Mar. 7, 2013

(65) Prior Publication Data
US 2014/0198847 A1    Jul. 17, 2014

(30) Foreign Application Priority Data

Aug. 31, 2011 (JP) ................................. 2011-188995
Nov. 18, 2011 (JP) ................................. 2011-253173

(51) Int. Cl.
*H04N 7/12* (2006.01)
*H04N 19/65* (2014.01)
(Continued)

(52) U.S. Cl.
CPC ... *H04N 19/00854* (2013.01); *H04N 13/0048* (2013.01); *H04N 19/597* (2014.11); *H04N 19/61* (2014.11)

(58) Field of Classification Search
None
See application file for complete search history.

(56) References Cited

U.S. PATENT DOCUMENTS

| 8,537,200 B2 | 9/2013 | Zhang et al. |
| 8,625,918 B2 | 1/2014 | Takahashi et al. |

(Continued)

FOREIGN PATENT DOCUMENTS

| CN | 101222639 A | 7/2008 |
| CN | 101911700 A | 12/2010 |

(Continued)

OTHER PUBLICATIONS

Takahashi et al., International Organisation for Standardisation ISO/IEC JTC1/SC29/WG11, MPEG2011/M22566, Coding of Moving Pictures and Audio, Descriptions of 3D Video Coding Proposal (HEVC-Compatible Category), Geneva, Switzerland, Nov. 2011, 36 pages.

(Continued)

*Primary Examiner* — James M Anderson, II
(74) *Attorney, Agent, or Firm* — Wolf, Greenfield & Sacks, P.C.

(57) ABSTRACT

The present technique relates to an encoding device, an encoding method, a decoding device, and a decoding method capable of improving encoding efficiency of a parallax image using information about the parallax image. The correction unit corrects a prediction image of a parallax image of a reference viewpoint using information about the parallax image of the reference viewpoint. The arithmetic operation unit encodes the parallax image of the reference viewpoint using the corrected prediction image. The encoded parallax image of the reference viewpoint and the information about the parallax image of the reference viewpoint are transmitted. The present technique can be applied to, for example, an encoding device of the parallax image.

8 Claims, 26 Drawing Sheets

(51) Int. Cl.
*H04N 13/00* (2018.01)
*H04N 19/597* (2014.01)
*H04N 19/61* (2014.01)

(56) References Cited

U.S. PATENT DOCUMENTS

| | | | |
|---|---|---|---|
| 9,491,462 B2 | 11/2016 | Takahashi et al. | |
| 9,560,375 B2 | 1/2017 | Takahashi et al. | |
| 9,615,079 B2 | 4/2017 | Takahashi et al. | |
| 2010/0002948 A1 | 1/2010 | Gangwal et al. | |
| 2010/0296746 A1 | 11/2010 | Strom et al. | |
| 2010/0309286 A1 | 12/2010 | Chen et al. | |
| 2010/0329334 A1 | 12/2010 | Kim et al. | |
| 2011/0025829 A1* | 2/2011 | McNamer | H04N 13/021 |
| | | | 348/50 |
| 2011/0096832 A1 | 4/2011 | Zhang et al. | |
| 2011/0221861 A1 | 9/2011 | Jeon et al. | |
| 2011/0222602 A1 | 9/2011 | Sung et al. | |
| 2011/0242278 A1 | 10/2011 | Yang et al. | |
| 2011/0255592 A1 | 10/2011 | Sung et al. | |
| 2011/0274166 A1 | 11/2011 | Jeon et al. | |
| 2011/0279645 A1 | 11/2011 | Newton et al. | |
| 2011/0310982 A1 | 12/2011 | Yang et al. | |
| 2012/0014614 A1 | 1/2012 | Takahashi et al. | |
| 2013/0088570 A1 | 4/2013 | Takahashi et al. | |
| 2013/0147915 A1 | 6/2013 | Wiegand et al. | |
| 2013/0222534 A1 | 8/2013 | Rusanovskyy et al. | |
| 2013/0322543 A1 | 12/2013 | Sugio et al. | |
| 2013/0342647 A1 | 12/2013 | Takahashi et al. | |
| 2014/0002592 A1 | 1/2014 | Takahashi et al. | |
| 2014/0085418 A1 | 3/2014 | Takahashi et al. | |
| 2014/0104383 A1 | 4/2014 | Takahashi et al. | |
| 2014/0126641 A1 | 5/2014 | Takahashi et al. | |
| 2014/0126642 A1 | 5/2014 | Takahashi et al. | |
| 2014/0321546 A1 | 10/2014 | Sakurai et al. | |
| 2014/0341285 A1 | 11/2014 | Sakurai et al. | |
| 2016/0295228 A1 | 10/2016 | Takahashi et al. | |
| 2016/0295229 A1 | 10/2016 | Takahashi et al. | |
| 2016/0295230 A1 | 10/2016 | Takahashi et al. | |
| 2017/0041630 A1 | 2/2017 | Takahashi et al. | |
| 2017/0041631 A1 | 2/2017 | Takahashi et al. | |
| 2017/0064283 A1 | 3/2017 | Takahashi et al. | |

FOREIGN PATENT DOCUMENTS

| | | | | |
|---|---|---|---|---|
| EP | 2387243 A2 | * | 11/2011 | H04N 13/0003 |
| EP | 2688280 A1 | | 1/2014 | |
| JP | 2002-058031 A | | 2/2002 | |
| JP | 2007166381 A | * | 6/2007 | |
| JP | 2008-263528 A | | 10/2008 | |
| JP | 2009-044722 A | | 2/2009 | |
| JP | 2010-506287 A | | 2/2010 | |
| JP | 2010-157825 A | | 7/2010 | |
| JP | 2010-267231 A | | 11/2010 | |
| JP | 2011-061486 A | | 3/2011 | |
| JP | 2011-511597 A | | 4/2011 | |
| JP | 2011-512067 A | | 4/2011 | |
| WO | WO 2007/069487 A1 | | 6/2007 | |
| WO | WO 2010/021666 A1 | | 2/2010 | |
| WO | WO 2010/071291 A1 | | 6/2010 | |
| WO | WO 2010/079921 A2 | | 7/2010 | |
| WO | WO 2010/084437 A2 | | 7/2010 | |
| WO | WO 2010/092772 A1 | | 8/2010 | |
| WO | WO 2011/013030 A1 | | 2/2011 | |
| WO | WO 2011/046607 A2 | | 4/2011 | |

OTHER PUBLICATIONS

Yea et al., RD-Optimized View Synthesis Prediction for Multiview Video Coding, Image Processing, ICIP 2007, IEEE, 4 pages.

No Author Listed, International Organisation for Standardisation (Organisation Internationale De Normalisation) Iso/Iec Jtc1/Sc29/Wg11 Coding of Moving Pictures and Audio. Call for Proposals on 3D Video Coding Technology. Geneva, Switzerland. Mar. 2011. 20 pages.

Wiegand et al., WD3: Working draft 3 of high-efficiency video coding. Joint Collaborative Team on Video Coding (JCT-VC) of ITU-T SG16 WP3 and ISO/IEC JTC1/SC29/WG11. 5$^{th}$ Meeting: Geneva, CH. Mar. 16-23, 2011. 205 pages.

No Author Listed, "Call for Proposals on 3D Video Coding Technology", Int'l Organisation for Standardisation, Coding of Moving Pictures and Audio, ISO/IEC JTC1/SC29/WG11, Geneva, Switzerland, Mar. 2011, 20 pages.

Oh et al., "Non-linear Bi-directional Prediction for Depth Coding", Advances in Multimedia Information Processing—PCM 2009, Springer Berlin Heidelberg, Dec. 15, 2009, p. 522-531.

Wiegand et al., "WD3: Working Draft 3 of High-Efficiency Video Coding", Joint Collaborative Team on Video Coding (JCT-VC) of ITU-T SG16 WP3 and ISO/IEC JTC1/SC29/WG11, 5$^{th}$ Meeting: Geneva, CH Mar. 16-23, 2011, 206 pages.

U.S. Appl. No. 14/116,400, filed Nov. 8, 2013, Takahashi et al.
U.S. Appl. No. 14/125,451, filed Dec. 11, 2013, Takahashi et al.
U.S. Appl. No. 15/177,065, filed Jun. 8, 2016, Takahashi et al.
U.S. Appl. No. 15/177,099, filed Jun. 8, 2016, Takahashi et al.
U.S. Appl. No. 15/177,122, filed Jun. 8, 2016, Takahashi et al.

Chinese Office Action and English translation thereof dated Apr. 12, 2016 in connection with Chinese Application No. 201280012933.1

Japanese Office Action and English translation thereof dated Apr. 12, 2016 in connection with Japanese Application No. 2013-505866.

International Search Report and Written Opinion and English translation thereof dated May 29, 2012 in connection with International Application No. PCT/JP2012/056083.

International Search Report and Written Opinion and English translation thereof dated May 29, 2012 in connection with International Application No. PCT/JP2012/056084.

International Preliminary Report on Patentability and English translation thereof dated Oct. 3, 2013 in connection with International Application No. PCT/JP2012/056083.

International Preliminary Report on Patentability and English translation thereof dated Oct. 3, 2013 in connection with International Application No. PCT/JP2012/056084.

Extended European Search Report dated Aug. 7, 2014 in connection with Application No. 12760156.5.

[No Author Listed], Coding of moving pictures and audio. Draft Call for Proposals on 3D Video Coding Technology. ISO/IEC JTC1/SC29/WG11. Doc. N11679, Guangzhou, China, Oct. 2010.

Chen et al., Coding of moving pictures and audio. Response to Call for Evidence on Option-1 Video Coding Technology. ISO/IEC JTC1/SC29/WG11. MPEG2010/M18570. Guangzhou, China, Oct. 2010.

U.S. Appl. No. 13/178,609, filed Jul. 8, 2011, Takahashi et al.

* cited by examiner

FIG. 8

```
pic_parameter_set_rbsp( ) {
        pic_parameter_set_id
        seq_parameter_set_id
        entropy_coding_mode_flag
        num_ref_idx_l0_default_active_minus1
        num_ref_idx_l1_default_active_minus1
        pic_init_qp_minus26   /* relative to 26 */
        constrained_intra_pred_flag
        disparity_precision
        disparity_pic_same_flag
        rbsp_trailing_bits( )
}
```

FIG. 9

```
slice_header( ) {
  first_tb_in_slice
  entropy_slice_flag
  if( !entropy_slice_flag ) {
    slice_type
    pic_parameter_set_id
    frame_num
    if( IdrPicFlag )
      idr_pic_id
    if( pic_order_cnt_type = = 0 )
      pic_order_cnt_lsb /*
    if( slice_type = = P || slice_type = = B ) {
      num_ref_idx_active_override_flag
      if( num_ref_idx_active_override_flag ) {
        num_ref_idx_l0_active_minus1
        if( slice_type = = B )
          num_ref_idx_l1_active_minus1
      }
    }
  ref_pic_list_modification( )
  ref_pic_list_combination( )
  if( nal_ref_idc != 0 )
    dec_ref_pic_marking( )
  if( entropy_coding_mode_flag && slice_type != I)
    cabac_init_idc
    slice_qp_delta
  if( adaptive_loop_filter_enabled_flag )
    alf_param()
```

FIG. 10

```
if( deblocking_filter_control_present_flag ) {
    disable_deblocking_filter_idc
    if( disable_deblocking_filter_idc != 1 ) {
      slice_alpha_c0_offset_div2
        slice_beta_offset_div2
    }
  }
if( ! disparity_pic_same_flag ){
    if ( slice_type == I ){
      minimum_disparity
      maximum_disparity
      translation_x
    }else{
      delta_minimum_disparity
      delta_maximum_disparity
      delta_translation_x
    }
}
} else
  if( entropy_coding_mode_flag && slice_type != I)
    cabac_init_idc
}
```

FIG. 21

| | SLICE HEADER | SEI |
|---|---|---|
| FIRST TRANSMISSION METHOD | PARALLAX MAXIMUM VALUE, PARALLAX MINIMUM VALUE, INTER-CAMERA DISTANCE | — |
| SECOND TRANSMISSION METHOD | CORRECTION COEFFICIENT | PARALLAX MAXIMUM VALUE, PARALLAX MINIMUM VALUE, INTER-CAMERA DISTANCE |
| THIRD TRANSMISSION METHOD | PARALLAX MAXIMUM VALUE, PARALLAX MINIMUM VALUE, INTER-CAMERA DISTANCE, ADDITIONAL CORRECTION COEFFICIENT | — |

ENCODING DEVICE, ENCODING METHOD, DECODING DEVICE, AND DECODING METHOD

CROSS REFERENCE TO RELATED APPLICATIONS

The present application is the National Stage of International Application No. PCT/JP2012/071028, filed in the Japanese Patent Office as a Receiving Office on Aug. 21, 2012, titled "ENCODING DEVICE, ENCODING METHOD, DECODING DEVICE, AND DECODING METHOD," which claims the priority benefit to Japanese Patent Application No. 2011-188995, filed in the Japanese Patent Office on Aug. 31, 2011, and Japanese Patent Application No. 2011-253173, filed in the Japanese Patent Office on Nov. 18, 2011. Each of these applications is hereby incorporated by reference in its entirety.

TECHNICAL FIELD

The present technique relates to an encoding device, an encoding method, a decoding device, and a decoding method, and more particularly, relates to an encoding device, an encoding method, a decoding device, and a decoding method capable of improving encoding efficiency of a parallax image using information about the parallax image.

BACKGROUND ART

In recent years, 3D images attract attention, and a method of encoding a parallax image used for generation of a multi-viewpoint 3D image has been suggested (for example, see Non-Patent Document 1). It should be noted that the parallax image is an image including each pixel of a color image of a viewpoint corresponding to the parallax image and a parallax value representing the distance, in the horizontal direction, of the position on the screen of the pixel of the color image of the viewpoint serving as the base point which corresponds to the pixel.

An encoding method called HEVC (High Efficiency Video Coding) is now being standardized for the purpose of further improving the encoding efficiency as compared with AVC (Advanced Video Coding) method, and Non-Patent Document 2 was issued as a draft as of today, August, 2011.

CITATION LIST

Non-Patent Document

[Non-Patent Document 1] "Call for Proposals on 3D Video Coding Technology", ISO/IEC JTC1/SC29/WG11, MPEG2011/N12036, Geneva, Switzerland, March 2011

[Non-Patent Document 2] Thomas Wiegand, Woo-jin Han, Benjamin Bross, Jens-Rainer Ohm, Gary J. Sullivan, "WD3: Working Draft 3 of High-Efficiency Video Coding", JCTVC-E603_d5 (version5), May 20, 2011

SUMMARY OF THE INVENTION

Problems to be Solved by the Invention

However, no encoding method for improving the encoding efficiency of a parallax image using information about the parallax image has ever been created.

The present technique is made in view of such circumstances, and it is to enable improving the encoding efficiency of the parallax image using information about the parallax image.

Solutions to Problems

An encoding device of a first aspect of the present technique is an encoding device including a correction unit configured to correct a prediction image of a parallax image of a reference viewpoint using information about the parallax image of the reference viewpoint, an encoding unit configured to encode the parallax image of the reference viewpoint using the prediction image corrected by the correction unit; and a transmission unit configured to transmit the parallax image of the reference viewpoint encoded by the encoding unit and the information about the parallax image of the reference viewpoint.

An encoding method of a first aspect of the present technique corresponds to the encoding device of the first aspect of the present technique.

In the first aspect of the present technique, the prediction image of the parallax image of the reference viewpoint is corrected using the information about the parallax image of the reference viewpoint, and the parallax image of the reference viewpoint is encoded using the corrected prediction image, and the encoded parallax image of the reference viewpoint and the information about the parallax image of the reference viewpoint are transmitted.

A decoding device of a second aspect of the present technique is a decoding device including a reception unit configured to receive a parallax image of a reference viewpoint encoded using a prediction image of a parallax image of the reference viewpoint corrected using information about the parallax image of the reference viewpoint and the information about the parallax image of the reference viewpoint, a correction unit configured to correct a prediction image of the parallax image of the reference viewpoint using the information about the parallax image of the reference viewpoint received by the reception unit, and a decoding unit configured to decode the encoded parallax image of the reference viewpoint received by the reception unit using the prediction image corrected by the correction unit.

A decoding method of a second aspect of the present technique corresponds to the decoding device of the second aspect of the present technique.

In the second aspect of the present technique, the parallax image of the reference viewpoint encoded using the prediction image of the parallax image of the reference viewpoint corrected using information about the parallax image of the reference viewpoint and the information about the parallax image of the reference viewpoint are received, the prediction image of the parallax image of the reference viewpoint is corrected using the received information about the parallax image of the reference viewpoint, and the encoded parallax image of the reference viewpoint is decoded using the correction prediction image.

It should be noted that the encoding device of the first aspect and the decoding device of the second aspect can be achieved by causing a computer to execute a program.

In order to achieve the encoding device of the first aspect and the decoding device of the second aspect a program executed by the computer can be provided by transmitting via a transmission medium or recording the program to a recording medium.

Effects of the Invention

According to the first aspect of the present technique, the encoding efficiency of the parallax image can be improved by using information about the parallax image.

According to the second aspect of the present technique, the encoded data of the parallax image of which encoding efficiency has been improved by performing encoding using the information about the parallax image can be decoded

BRIEF DESCRIPTION OF DRAWINGS

FIG. 8 is a diagram illustrating an example of syntax of PPS of FIG. 7.

FIG. 9 is a diagram illustrating an example of syntax of a slice header.

FIG. 10 is a diagram illustrating an example of syntax of a slice header.

FIG. 21 is a table explaining transmission method of information used for correction of a prediction image.

MODES FOR CARRYING OUT THE INVENTION

<First Embodiment>
[Example of Configuration of First Embodiment of Encoding Device]

Figure 1:
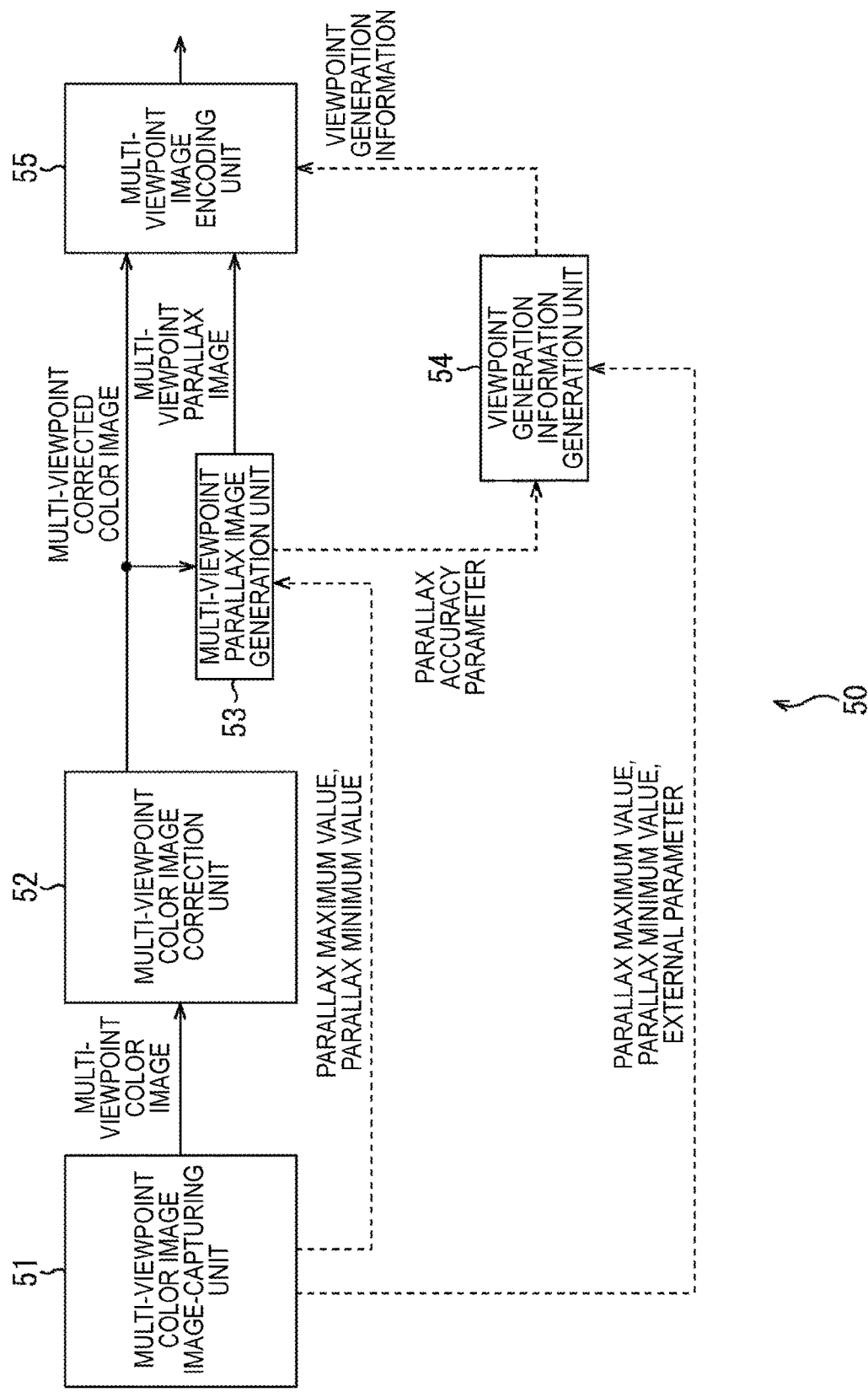
FIG. 1 is a block diagram illustrating an example of a configuration of a first embodiment of an encoding device to which the present technique is applied.

FIG. 1 is a block diagram illustrating an example of a configuration of a first embodiment of an encoding device to which the present technique is applied.

An encoding device 50 of FIG. 1 includes a multi-viewpoint color image image-capturing unit 51, a multi-viewpoint color image correction unit 52, a multi-viewpoint parallax image correction unit 53, a viewpoint generation information generation unit 54, and a multi-viewpoint image encoding unit 55.

The encoding device 50 encodes a parallax image of a predetermined viewpoint using information about the parallax image.

More specifically, the multi-viewpoint color image image-capturing unit 51 of the encoding device 50 captures color images of multiple viewpoints, and provides them as multi-viewpoint color images to the multi-viewpoint color image correction unit 52. The multi-viewpoint color image image-capturing unit 51 generates external parameter, parallax maximum value, and parallax minimum value (the details of which will be described later). The multi-viewpoint color image image-capturing unit 51 provides the external parameter, the parallax maximum value, and the parallax minimum value to the viewpoint generation information generation unit 54, and provides the parallax maximum value and the parallax minimum value to the multi-viewpoint parallax image generation unit 53.

It should be noted that the external parameter is a parameter for defining the position of multi-viewpoint color image image-capturing unit 51 in the horizontal direction. The parallax maximum value and the parallax minimum value are the maximum value and the minimum value, respectively, of the parallax values in a world coordinate that may occur in the multi-viewpoint parallax image.

The multi-viewpoint color image correction unit 52 performs color correction, brightness correction, distortion correction, and the like on the multi-viewpoint color images provided from the multi-viewpoint color image image-capturing unit 51. Accordingly, the focal distance of the multi-viewpoint color image image-capturing unit 51 in the corrected multi-viewpoint color image in the horizontal direction (X direction) is the same at all the viewpoints. The multi-viewpoint color image correction unit 52 provides the corrected multi-viewpoint color image to the multi-viewpoint parallax image generation unit 53 and the multi-viewpoint image encoding unit 55 as multi-viewpoint corrected color images.

The multi-viewpoint parallax image generation unit 53 generates a multi-viewpoint parallax image from the multi-viewpoint correction color image provided by the multi-viewpoint color image correction unit 52, based on the parallax maximum value and the parallax minimum value provided from the multi-viewpoint color image image-capturing unit 51. More specifically, the multi-viewpoint parallax image generation unit 53 derives the parallax value of each pixel from the multi-viewpoint correction color image for each viewpoint of multiple viewpoints (reference viewpoint), and normalizes the parallax value based on the parallax maximum value and the parallax minimum value. Then, the multi-viewpoint parallax image generation unit 53 generates a parallax image in which the parallax value of each pixel normalized is the pixel value of each pixel for each viewpoint of multiple viewpoints.

The multi-viewpoint parallax image generation unit 53 provides the generated multi-viewpoint parallax image, as the multi-viewpoint parallax image, to the multi-viewpoint image encoding unit 55. Further, the multi-viewpoint parallax image generation unit 53 generates a parallax accuracy parameter representing accuracy of the pixel value of the multi-viewpoint parallax image, and provides it to the viewpoint generation information generation unit 54.

The viewpoint generation information generation unit 54 generates the viewpoint generation information (viewpoint generation information) used for generating the color image of a viewpoint other than the multiple viewpoints using the multi-viewpoint correction color image and the parallax image. More specifically, the viewpoint generation information generation unit 54 obtains the inter-camera distance based on the external parameters provided by the multi-viewpoint color image image-capturing unit 51. The inter-camera distance is a distance between the position of the multi-viewpoint color image image-capturing unit 51 in the horizontal direction when the multi-viewpoint color image image-capturing unit 51 captures a color image at each viewpoint of the multi-viewpoint parallax image and the position of the multi-viewpoint color image image-capturing unit 51 in the horizontal direction when the multi-viewpoint color image image-capturing unit 51 captures a color image having a parallax corresponding to the parallax image with respect to the color image thus captured.

The viewpoint generation information generation unit 54 adopts, as viewpoint generation information, the parallax maximum value and the parallax minimum value provided by the multi-viewpoint color image image-capturing unit 51, the inter-camera distance, and the parallax accuracy parameter provided by the multi-viewpoint parallax image generation unit 53. The viewpoint generation information generation unit 54 provides the generated viewpoint generation information to the multi-viewpoint image encoding unit 55.

The multi-viewpoint image encoding unit 55 encodes the multi-viewpoint correction color image, provided from the multi-viewpoint color image correction unit 52, according to a HEVC method. The multi-viewpoint image encoding unit 55 encodes the multi-viewpoint parallax image provided by the multi-viewpoint parallax image generation unit 53 according to a method based on the HEVC method using, as information about the parallax, the parallax maximum value, the parallax minimum value, and the inter-camera distance from among the viewpoint generation information provided by the viewpoint generation information generation unit 54.

The multi-viewpoint image encoding unit 55 performs differential encoding on the parallax maximum value, the parallax minimum value, and the inter-camera distance in the viewpoint generation information provided by the viewpoint generation information generation unit 54, and causes such information to be included in information (encoding parameter) about encoding of the multi-viewpoint parallax image. Then, the multi-viewpoint image encoding unit 55 transmits, as an encoded bit stream, a bit stream including the multi-viewpoint corrected color images and the multi-viewpoint parallax image which are encoded, the parallax maximum value and the parallax minimum value and the intra-camera distance which are differential-encoded, the parallax accuracy parameter provided by the viewpoint generation information generation unit 54, and the like.

As described above, the multi-viewpoint image encoding unit 55 differential-encodes and transmits the parallax maximum value, the parallax minimum value, and the inter-camera distance, and therefore, can reduce the amount of codes of the viewpoint generation information. In order to provide a comfortable 3D image, it is likely not to greatly change the parallax maximum value, the parallax minimum value, and the inter-camera distance between pictures, and therefore, the differential encoding is effective for reducing the amount of codes.

In the encoding device 50, the multi-viewpoint parallax image is generated from the multi-viewpoint corrected color image, but it may be generated by sensors detecting the parallax value during image capturing of the multi-viewpoint color image.

[Explanation about Viewpoint Generation Information]

Figure 2:
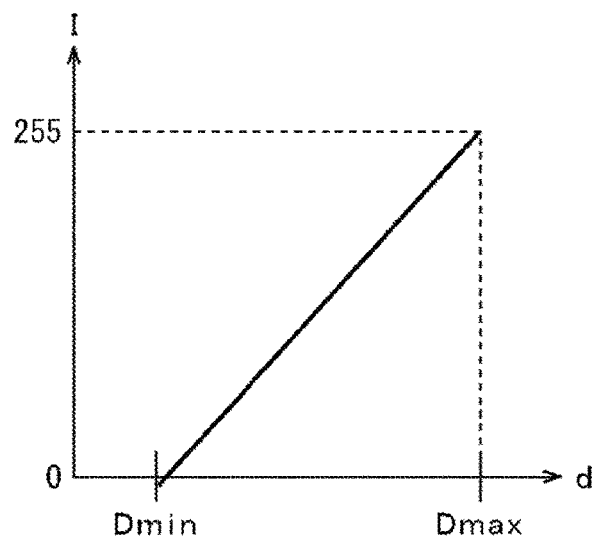
FIG. 2 is a graph explaining a parallax maximum value and a parallax minimum value of viewpoint generation information.

FIG. 2 is a graph explaining a parallax maximum value and a parallax minimum value of viewpoint generation information.

In FIG. 2, the horizontal axis denotes non-normalized parallax value, and the vertical axis denotes the pixel value of the parallax image.

As illustrated in FIG. 2, the multi-viewpoint parallax image generation unit 53 normalizes the parallax value of each pixel to, for example, a value of 0 to 255 using the parallax minimum value Dmin and the parallax maximum value Dmax. Then, the multi-viewpoint parallax image generation unit 53 generates a parallax image in which the parallax value of each of the normalized pixels having a value of 0 to 255, is the pixel value.

More specifically, the pixel value I of each pixel of the parallax image is such that the non-normalized parallax value d, the parallax minimum value Dmin, and the parallax maximum value Dmax of the pixel is expressed by the following equation (1).

[Equation 1]

$$I = \frac{255 * (d - D_{min})}{D_{max} - D_{min}} \qquad (1)$$

Therefore, according to the following equation (2), the decoding device described later needs to restore the non-normalized parallax value d from the pixel value I of each pixel of the parallax image using the parallax minimum value Dmin and parallax maximum value Dmax.

[Equation 2]

$$d = \frac{I}{255}(D_{max} - D_{min}) + D_{min} \qquad (2)$$

Accordingly, the parallax minimum value Dmin and the parallax maximum value Dmax are transmitted to the decoding device.

Figure 3:
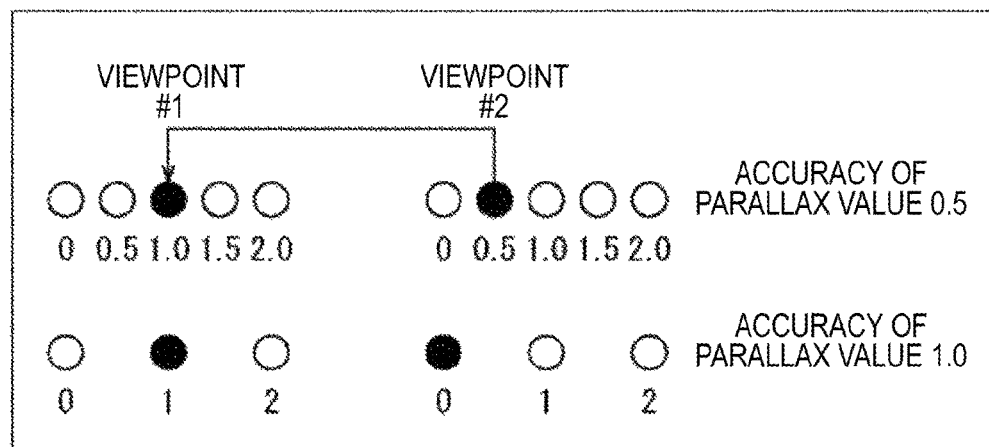
FIG. 3 is a diagram explaining parallax accuracy parameter of the viewpoint generation information.

FIG. 3 is a diagram explaining parallax accuracy parameter of the viewpoint generation information.

As shown in the upper row of FIG. 3, in a case where the non-normalized parallax value per normalized parallax value 1 is 0.5, the parallax accuracy parameter represents accuracy 0.5 of the parallax value. As shown in the lower row of FIG. 3, when the non-normalized parallax value per normalized parallax value 1 is 1, the parallax accuracy parameter represents 1.0 which is the accuracy of the parallax value.

In the example of FIG. 3, the non-normalized parallax value at the viewpoint #1 as the first viewpoint is 1.0, and the non-normalized parallax value at the viewpoint #2 as the second viewpoint is 0.5. Therefore, the normalized parallax value of the viewpoint #1 is 1.0 even though the accuracy of the parallax value is either 0.5 or 1.0. On the other hand, the parallax value of the viewpoint #2 is 0.5 where the accuracy of the parallax value is 0.5, it is zero when the accuracy of the parallax value is 1.0.

Figure 4:
FIG. 4 is a diagram explaining an inter-camera distance of the viewpoint generation information.

FIG. 4 is a diagram explaining an inter-camera distance of the viewpoint generation information.

As illustrated in FIG. 4, the inter-camera distance of the parallax image of the viewpoint #1 with respect to the viewpoint #2 is a distance between the position represented by the external parameter of the viewpoint #1 and the position represented by the external parameter of the viewpoint #2.

[Example of Configuration of Multi-Viewpoint Image Encoding Unit]

Figure 5:
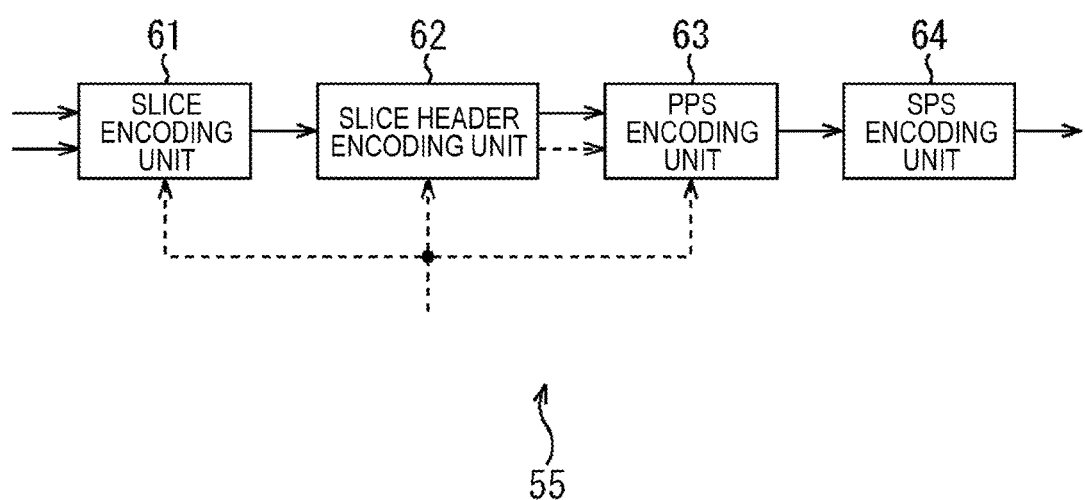
FIG. 5 is a block diagram illustrating an example of a configuration of the multi-viewpoint image encoding unit of FIG. 1.

FIG. 5 is a block diagram illustrating an example of a configuration of the multi-viewpoint image encoding unit 55 of FIG. 1.

The multi-viewpoint image encoding unit 55 of FIG. 5 includes a slice encoding unit 61, a slice header encoding unit 62, a PPS encoding unit 63, and an SPS encoding unit 64.

The slice encoding unit 61 of the multi-viewpoint image encoding unit 55 encodes the multi-viewpoint corrected color image provided by the multi-viewpoint color image correction unit 52 in accordance with the HEVC method in units of slices. The slice encoding unit 61 encodes the multi-viewpoint parallax image provided by the multi-viewpoint parallax image generation unit 53 according to a method based on HEVC method in units of slices using, as information about the parallax, the parallax maximum value, the parallax minimum value, and the inter-camera distance from among the viewpoint generation information provided by the viewpoint generation information generation unit 54 of FIG. 1. The slice encoding unit 61 provides the slice header encoding unit 62 with encoded data and the like in units of slices obtained as a result of encoding.

The slice header encoding unit 62 determines that the parallax maximum value, the parallax minimum value, and the inter-camera distance in the viewpoint generation information provided by the viewpoint generation information generation unit 54 are the parallax maximum value, the parallax minimum value, and the inter-camera distance of the slice of the current processing target, and holds them.

The slice header encoding unit 62 also determines whether or not the parallax maximum value, the parallax minimum value, and the inter-camera distance of the slice of the current processing target are the same as the parallax maximum value, the parallax minimum value, and the inter-camera distance, respectively, of the previous slice in the order of encoding with respect to the current slice, and this determination is made in unit to which the same PPS is given (hereinafter referred to as the same PPS unit).

Then, when all the parallax maximum value, the parallax minimum value, and the inter-camera distance of the slice constituting the same PPS unit are determined to be the same as the parallax maximum value, the parallax minimum value, and the inter-camera distance of the previous slice in the order of encoding, the slice header encoding unit 62 adds information about encoding other than the parallax maximum value, the parallax minimum value, and the inter-camera distance of that slice as the slice header of the encoded data of each slice constituting the same PPS unit, and provides the information to the PPS encoding unit 63. The slice header encoding unit 62 provides the PPS encoding unit 63 with a transmission flag indicating absence of transmission of the difference-encoded results of the parallax maximum value, the parallax minimum value, and the inter-camera distance.

On the other hand, when all the parallax maximum value, the parallax minimum value, and the inter-camera distance of at least one slice constituting the same PPS unit are determined not to be the same as the parallax maximum value, the parallax minimum value, and the inter-camera distance of the previous slice in the order of encoding, the slice header encoding unit 62 adds information about encoding including the parallax maximum value, the parallax minimum value, and the inter-camera distance of that slice as the slice header to the encoded data of the intra-type slice, and provides the information to the PPS encoding unit 63.

The slice header encoding unit 62 performs difference encoding on the parallax maximum value, the parallax minimum value, and the inter-camera distance of the inter-type slice. More specifically, the slice header encoding unit 62 subtracts the parallax maximum value, the parallax minimum value, and the inter-camera distance of the previous slice in the order of encoding with respect to the current slice from the parallax maximum value, the parallax minimum value, and the inter-camera distance of the inter-type slice, respectively, and obtains a difference-encoded result. Then, the slice header encoding unit 62 adds information about encoding including the difference-encoded result of the parallax maximum value, the parallax minimum value, and the inter-camera distance as the slice header to the encoded data of the inter-type slice, and provides the information to the PPS encoding unit 63.

In this case, the slice header encoding unit 62 provides the PPS encoding unit 63 with a transmission flag indicating presence of transmission of the difference-encoded results of the parallax maximum value, the parallax minimum value, and the inter-camera distance.

The PPS encoding unit 63 generates PPS including the transmission flag provided from the slice header encoding unit 62 and the parallax accuracy parameter in the viewpoint generation information provided from the viewpoint generation information generation unit 54 of FIG. 1. The PPS encoding unit 63 adds, in the same PPS unit, the PPS to the encoded data in units of slices to which the slice header provided from the slice header encoding unit 62 is added, and provides it to the SPS encoding unit 64.

The SPS encoding unit 64 generates SPS. Then, the SPS encoding unit 64 adds, in units of sequences, the SPS to the encoded data to which the PPS provided from the PPS encoding unit 63 is added. The SPS encoding unit 64 functions as a transmission unit, and transmits, as an encoded bit stream, the bit stream obtained as a result.

[Example of Configuration of Slice Encoding Unit]

Figure 6:
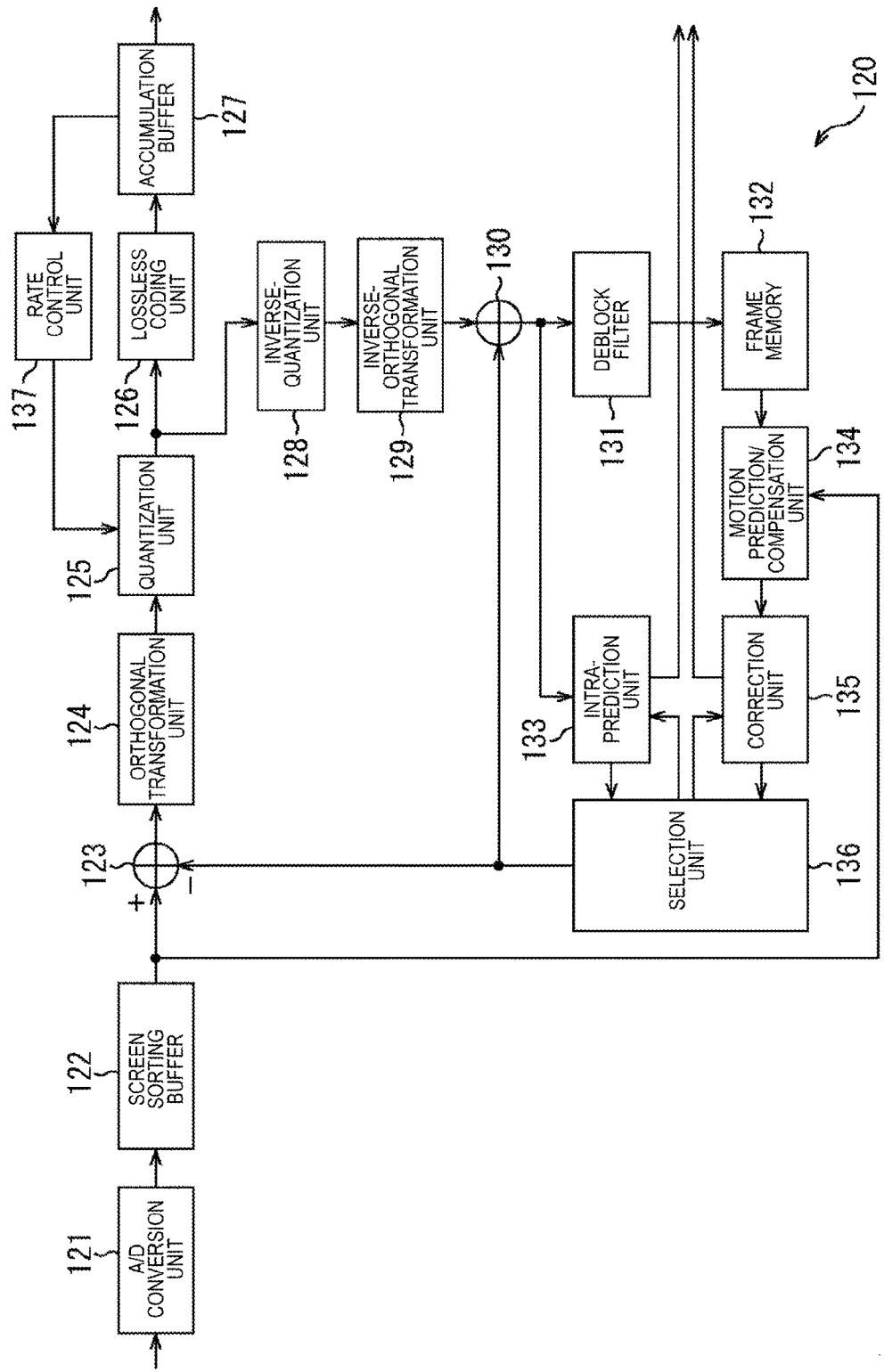
FIG. 6 is a block diagram illustrating an example of a configuration of an encoding unit.

FIG. 6 is a block diagram illustrating an example of a configuration of the encoding unit for encoding the parallax image of any given viewpoint in the slice encoding unit 61 of FIG. 5. More specifically, the encoding unit for encoding multi-viewpoint parallax image in the slice encoding unit 61 is constituted by as many encoding units 120 of FIG. 6 as the number of viewpoints.

The encoding unit 120 of FIG. 6 includes an A/D conversion unit 121, a screen sort buffer 122, an arithmetic operation unit 123, an orthogonal transformation unit 124, a quantization unit 125, a lossless encoding unit 126, an accumulation buffer 127, an inverse quantization unit 128, an inverse-orthogonal transformation unit 129, an addition unit 130, a deblock filter 131, a frame memory 132, an intra-prediction unit 133, a motion prediction/compensation unit 134, a correction unit 135, a selection unit 136, and a rate control unit 137.

The A/D conversion unit 121 of the encoding unit 120 performs A/D conversion on multiplexed images in units of frames of predetermined viewpoints provided by the multi-viewpoint parallax image generation unit 53 of FIG. 1, and outputs the images to the screen sort buffer 122 to be stored, so that the images are stored therein. The screen sort buffer 122 sorts the parallax images in units of frames in the order of display stored into the order for encoding in accordance with a GOP (Group of Picture) structure, and outputs the images to the arithmetic operation unit 123, the intra-prediction unit 133, and the motion prediction/compensation unit 134.

The arithmetic operation unit 123 functions as an encoding unit, and calculates difference between the prediction image provided by the selection unit 136 and the parallax image of encoding target which is output from the screen sort buffer 122, thus encoding the parallax image of the encoding target. More specifically, the arithmetic operation unit 123 subtracts the prediction image provided by the selection unit 136 from the parallax image of the encoding target which is output from the screen sort buffer 122. The arithmetic operation unit 123 outputs the image obtained as a result of the subtraction, as the residual information, to the orthogonal transformation unit 124. When the selection unit 136 does not provide the prediction image, the arithmetic operation unit 123 outputs the parallax image, which is read from the screen sort buffer 122, to the orthogonal transformation unit 124 as the residual information without processing.

The orthogonal transformation unit 124 applies orthogonal transformation such as discrete cosine transform and Karhunen-Loeve transform on the residual information provided from the arithmetic operation unit 123, and provides the thus-obtained coefficients to the quantization unit 125.

The quantization unit 125 quantizes the coefficients supplied from the orthogonal transformation unit 124. The quantized coefficients are input into the lossless encoding unit 126.

The lossless encoding unit 126 performs lossless encoding such as variable length encoding (for example, CAVLC (Context-Adaptive Variable Length Coding)) and arithmetic encoding (for example, CABAC (Context-Adaptive Binary Arithmetic Coding)) on the coefficients quantized by the quantization unit 125. The lossless encoding unit 126 provides the encoded data obtained as a result of the lossless encoding to the accumulation buffer 127, and accumulates the data therein.

The accumulation buffer 127 temporarily stores the encoded data provided by the lossless encoding unit 126, and provides the data to the slice header encoding unit 62 in units of slices.

The quantized coefficients which are output from the quantization unit 125 are also input into the inverse quantization unit 128, and after the coefficients are inversely quantized, the coefficients are provided to the inverse-orthogonal transformation unit 129.

The inverse-orthogonal transformation unit 129 applies inverse-orthogonal transformation such as inverse-discrete cosine transform and inverse-Karhunen-Loeve transform on the coefficients provided by the inverse quantization unit 128, and provides the residual information obtained as a result to the addition unit 130.

The addition unit 130 adds the residual information serving as the parallax image of the decoding target provided by the inverse-orthogonal transformation unit 129 and the prediction image provided by the selection unit 136, and obtains the parallax image locally decoded. It should be noted that when the selection unit 136 does not provide the prediction image, the addition unit 130 adopts the residual information provided by the inverse-orthogonal transformation unit 129 as the locally decoded parallax image. The addition unit 130 provides the locally decoded parallax image to the deblock filter 131, and provides the image as the reference image to the intra-prediction unit 133.

The deblock filter 131 filters the locally decoded parallax image provided by the addition unit 130, thus eliminating block distortion. The deblock filter 131 provides the thus-obtained parallax image to the frame memory 132, so that the image is accumulated therein. The parallax image accumulated in the frame memory 132 is output as the reference image to the motion prediction/compensation unit 134.

The intra-prediction unit 133 performs intra-prediction in all the intra-prediction modes to be the candidates using the reference image provided by the addition unit 130 to, thus generating prediction images.

The intra-prediction unit 133 calculates the cost function value for all the intra-prediction modes to be the candidates (the details of which will be described later in detail). Then, the intra-prediction unit 133 determines, as the optimum intra-prediction mode, the intra-prediction mode in which the cost function value is the minimum. The intra-prediction unit 133 provides the prediction image generated in the optimum intra-prediction mode and the corresponding cost function value to the selection unit 136. When the intra-prediction unit 133 receives notification of selection of the prediction image generated in the optimum intra-prediction mode from the selection unit 136, the intra-prediction unit 133 provides the intra-prediction information indicating the optimum intra-prediction mode and the like to the slice header encoding unit 62 of FIG. 5. This intra-prediction information is included in the slice header as the information about encoding.

The cost function value is also referred to as an RD (Rate Distortion) cost, and, for example, it is calculated based on a method of any one of High Complexity mode and Low Complexity mode defined in a JM (Joint Model) which is reference software according to H.264/AVC method.

More specifically, when the High Complexity mode is employed as the method for calculating the cost function value, lossless encoding is temporarily performed in all the prediction modes to be the candidates, and the cost function value represented by the subsequent equation (3) is calculated in each prediction mode.

$$\text{Cost(Mode)}=D+\lambda \cdot R \quad (3)$$

D denotes a difference (distortion) of the original image and the decoded image. R denotes an amount of generated symbols including coefficients of the orthogonal transformation. $\lambda$ denotes a Lagrange multiplier given as a function of a quantization parameter QP.

On the other hand, more specifically, when the Low Complexity mode is employed as the method for calculating the cost function value, the decoded image is generated for all the prediction modes to be the candidates, and the header bit such as information indicating prediction mode is calculated, and the cost function represented by the following equation (4) is calculated for each prediction mode.

Cost(Mode)=$D$+QPtoQuant(QP)·Header_Bit (4)

D denotes a difference (distortion) of the original image and the decoded image. Header_Bit denotes a header bit in a prediction mode. QPtoQuant denotes a function given as a function of a quantization parameter QP.

In the Low Complexity mode, the decoded images may be generated in all the prediction modes, and it is not necessary to perform the lossless encoding, and therefore, the amount of calculation is smaller. In this case, suppose that the High Complexity mode is employed as the method for calculating the cost function value.

The motion prediction/compensation unit 134 performs the motion prediction processing in all the inter-prediction modes to be the candidates, based on the parallax image provided by the screen sort buffer 122 and the reference image provided by the frame memory 132, thus generating a motion vector. More specifically, the motion prediction/compensation unit 134 collates the reference image with the parallax image provided by the screen sort buffer 122 in each inter-prediction mode, and generates the motion vector.

It should be noted that the inter-prediction mode is information representing the size of blocks which are targets of inter-prediction, the prediction direction, and the reference index. The prediction direction includes prediction in forward direction using a reference image of which display time is earlier than the parallax image which is target of inter-prediction (L0 prediction), prediction in backward direction using a reference image of which display time is later than the parallax image which is target of inter-prediction (L1 prediction), and prediction in both directions using a reference image of which display time is earlier than the parallax image which is target of inter-prediction and a reference image of which display time is later than the parallax image which is target of inter-prediction (Bi-prediction). The reference index is a number for identifying the reference image, and, for example, a reference index of an image close to the parallax image which is the target of the inter-prediction has a smaller number.

The motion prediction/compensation unit 134 functions as a prediction image generation unit, and based on the motion vector generated in the inter-prediction modes, the motion prediction/compensation unit 134 reads the reference image from the frame memory 132, thus performing motion compensation processing. The motion prediction/compensation unit 134 provides the prediction image generated as the result to the correction unit 135.

The correction unit 135 generates (sets) the correction coefficients used when the prediction image is corrected, using, as the information about the parallax image, the parallax maximum value, the parallax minimum value, and the inter-camera distance in the viewpoint generation information provided by the viewpoint generation information generation unit 54 of FIG. 1. The correction unit 135 uses the coefficients to correct the prediction image in each inter-prediction mode provided by the motion prediction/compensation unit 134.

In this case, the position $Z_c$ in the depth direction of the subject of the parallax image of the encoding target and the position $Z_p$ in the depth direction of the subject of the prediction image are expressed by the following equation (5).

[Equation 3]

$$Z_c = \frac{L_c f}{d_c}\ Z_p = \frac{L_p f}{d_p} \quad (5)$$

In the equation (5), $L_c$, $L_p$ are the inter-camera distance of the parallax image of the encoding target and the inter-camera distance of the prediction image, respectively. It should be noted that f is the focal distance common to the prediction image and the parallax image of the encoding target. It should be noted that $d_c$, $d_p$ are the absolute value of the non-normalized parallax value of the parallax image of the encoding target and the absolute value of the non-normalized parallax value of the prediction image, respectively.

The parallax value $I_c$ of the parallax image of the encoding target and the parallax value $I_p$ of the prediction image are expressed by the following equation (6) using the absolute values $d_c$, $d_p$ of the non-normalized parallax values.

[Equation 4]

$$I_c = \frac{255*(d_c - D^c_{min})}{D^c_{max} - D^c_{min}}$$

$$I_p = \frac{255*(d_p - D^p_{min})}{D^p_{max} - D^p_{min}} \quad (6)$$

In the equation (6), $D^c_{min}$, $D^p_{min}$ are the parallax minimum value of the parallax image of the encoding target and the parallax minimum value of the prediction image, respectively. $D^c_{max}$, $D^p_{max}$ are the parallax maximum value of the parallax image of the encoding target and the parallax maximum value of the prediction image, respectively.

Therefore, even when the position $Z_c$ in the depth direction of the subject of the parallax image of the encoding target and the position $Z_p$ in the depth direction of the subject of the prediction image are the same, the parallax value $I_c$ and the parallax value $I_p$ are different when at least one of the inter-camera distances $L_c$ and $L_p$, the parallax minimum value $D^c_{min}$ and $D^p_{min}$, and the parallax maximum value $D^c_{max}$, $D^p_{max}$ is different.

Accordingly, when the position $Z_c$ and the position $Z_p$ are the same, the correction unit 135 generates correction coefficients for correcting the prediction image so that the parallax value $I_c$ and the parallax value $I_p$ become the same.

More specifically, when the position $Z_c$ and the position $Z_p$ are the same, the following equation (7) is established based on the equation (5) described above.

[Equation 5]

$$\frac{L_c f}{d_c} = \frac{L_p f}{d_p} \quad (7)$$

When the equation (7) is modified, the following equation (8) is obtained.

[Equation 6]

$$d_c = \frac{L_c}{L_p} d_p \quad (8)$$

Then, when the absolute values $d_c$, $d_p$ of the non-normalized parallax values of the equation (8) are replaced with the parallax value $I_c$ and the parallax value $I_p$ using the equation (6) described above, then, the following equation (9) is obtained.

[Equation 7]

$$\frac{I_c(D^c_{max} - D^c_{min})}{255} + D^c_{min} = \frac{L_c}{L_p}\left(\frac{I_p(D^p_{max} - D^p_{min})}{255} + D^p_{min}\right) \quad (9)$$

Accordingly, the parallax value $I_c$ is expressed by the following equation (10) using the parallax value $I_p$.

[Equation 8]

$$I_c = \frac{\frac{L_c}{L_p}(D^p_{max} - D^p_{min})}{D^c_{max} - D^c_{min}} I_p + 255 \frac{\frac{L_c}{L_p}D^p_{min} - D^c_{min}}{D^c_{max} - D^c_{min}} \quad (10)$$

$$= aI_p + b$$

Therefore, the correction unit 135 generates a and b of the equation (10) as the correction coefficients. Then, the correction unit 135 uses the correction coefficients a, b and the parallax value $I_p$ to obtain the parallax value $I_c$ of the equation (10) as the parallax value of the prediction image after the correction.

The correction unit 135 calculates the cost function value in each inter-prediction mode using the corrected prediction image, and determines the inter-prediction mode of which cost function value is the minimum as the optimum inter-measurement mode. Then, the correction unit 135 provides the cost function value and the prediction image generated in the optimum inter-prediction mode to the selection unit 136.

Further, when the correction unit 135 receives notification of selection of the prediction image generated in the optimum inter-prediction mode from the selection unit 136, the correction unit 135 outputs the motion information to the slice header encoding unit 62. This motion information includes the optimum inter-prediction mode, the prediction vector index, motion vector residual which is obtained by subtracting the motion vector represented by the prediction vector index from the current motion vector, and the like. It should be noted that the prediction vector index is information for identifying a motion vector from among the motion vectors to be the candidates used for generation of the prediction images of the decoded parallax image. The motion information is included as the information about encoding in the slice header.

The selection unit 136 determines, as the optimum prediction mode, one of the optimum intra-prediction mode and the optimum inter-prediction mode, based on the cost function value provided by the intra-prediction unit 133 and the correction unit 135. Then, the selection unit 136 provides the prediction image in the optimum prediction mode to the arithmetic operation unit 123 and the addition unit 130. The selection unit 136 notifies selection of the prediction image in the optimum prediction mode to the intra-prediction unit 133 or the correction unit 135.

The rate control unit 137 controls the rate of the quantization operation of the quantization unit 125 so as not to cause overflow and underflow, based on the encoded data accumulated in the accumulation buffer 127.

[Example of Configuration of Encoded Bit Stream]

Figure 7:
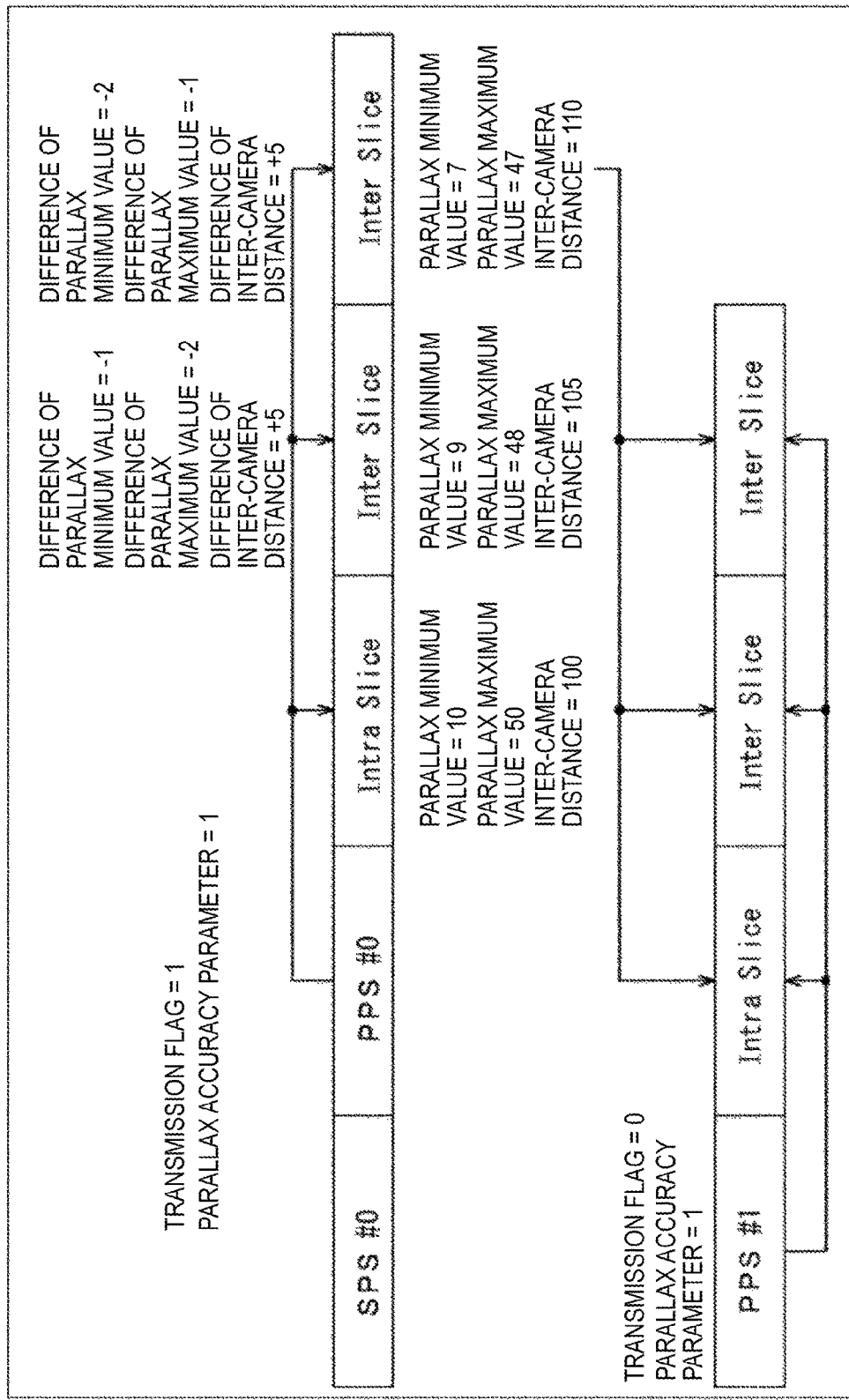
FIG. 7 is a diagram illustrating an example of a configuration of an encoded bit stream.

FIG. 7 is a diagram illustrating an example of a configuration of an encoded bit stream.

In FIG. 7, for the sake of explanation, only encoded data of the slice of the multi-viewpoint parallax image are described. However, in reality, the encoded bit stream is also arranged with the encoded data of the slice of the multi-viewpoint color image. This is applicable to FIG. 22 and FIG. 23 described later.

In the example of FIG. 7, the parallax maximum value, the parallax minimum value, and the inter-camera distance of one intra-type slice and the two inter-type slices constituting the same PPS unit of the PPS #0 which is the 0th PPS are not the same as the parallax maximum value, the parallax minimum value, and the inter-camera distance, respectively, of the previous slice in the order of encoding. Therefore, the PPS #0 includes a transmission flag "1" indicating presence of transmission. In the example of FIG. 7, the parallax accuracy of the slice constituting the same PPS unit of the PPS #0 is 0.5, and the PPS #0 includes "1" representing the parallax accuracy 0.5 as the parallax accuracy parameter.

Further, in the example of FIG. 7, the parallax minimum value of the intra-type slice constituting the same PPS unit of the PPS #0 is 10, and the parallax maximum value thereof is 50, and the inter-camera distance thereof is 100. Therefore, the slice header of the slice includes the parallax minimum value "10", the parallax maximum value "50", and the inter-camera distance "100".

In the example of FIG. 7, the parallax minimum value of the first inter-type slice constituting the same PPS unit of the PPS #0 is 9, and the parallax maximum value thereof is 48, and the inter-camera distance thereof is 105. Therefore, the slice header of the slice includes, as the difference-encoded result of the parallax minimum value, difference "−1" which is obtained by subtracting the parallax minimum value "10" of the intra-type slice which is arranged before the slice in question in the order of encoding from the parallax minimum value "9" of the slice in question. Likewise, the difference "−2" of the parallax maximum value is included as the difference-encoded result of the parallax maximum value, and the difference "5" of the inter-camera distance is included as the difference-encoded result of the inter-camera distance.

Further, in the example of FIG. 7, the parallax minimum value of the second inter-type slice constituting the same PPS unit of the PPS #0 is 7, and the parallax maximum value thereof is 47, and the inter-camera distance thereof is 110. Therefore, the slice header of the slice includes, as the difference-encoded result of the parallax minimum value, difference "−2" which is obtained by subtracting the parallax minimum value "9" of the first inter-type slice which is arranged before the slice in question in the order of encoding from the parallax minimum value "7" of the slice in question. Likewise, the difference "−1" of the parallax maximum value is included as the difference-encoded result of the parallax maximum value, and the difference "5" of the inter-camera distance is included as the difference-encoded result of the inter-camera distance.

In the example of FIG. 7, the parallax maximum value, the parallax minimum value, and the inter-camera distance of one intra-type slice and the two inter-type slices constituting the same PPS unit of the PPS #1 which is the first PPS are the same as the parallax maximum value, the parallax minimum value, and the inter-camera distance, respectively, of the previous slice in the order of encoding. More specifically, the parallax maximum value, the parallax minimum value, and the inter-camera distance of one intra-type slice and the two inter-type slices constituting the same PPS unit of the PPS #1 which is the first PPS are "7", "47", and "110", respectively, which are the same as those of the second inter-type slice constituting the same PPS unit of the PPS #0. Therefore, the PPS #1 includes a transmission flag "0" indicating absence of transmission. In the example of FIG. 7, the parallax accuracy of the slice constituting the same PPS unit of the PPS #1 is 0.5, and the PPS #1 includes "1" representing the parallax accuracy 0.5 as the parallax accuracy parameter.

[Example of Syntax of PPS]

FIG. 8 is a diagram illustrating an example of syntax of PPS of FIG. 7.

As illustrated in FIG. 8, the PPS includes parallax accuracy parameter (disparity_precision) and transmission flag (dsiparity_pic_same_flag). For example, the parallax accuracy parameter is "0" when it indicates the parallax accuracy 1, and the parallax accuracy parameter is "2" when it indicates the parallax accuracy (the accuracy of the depth information) 0.25. As described above, the parallax accuracy parameter is "1" when it indicates the parallax accuracy (the accuracy of the depth information) 0.5. As described above, the transmission flag is "1" when it indicates presence of transmission, and the transmission flag is "0" when it indicates absence of transmission.

[Example of Syntax of Slice Header]

FIGS. 9 and 10 are diagrams illustrating an example of syntax of a slice header.

As illustrated in FIG. 10, when the transmission flag is 1, and the type of the slice is intra-type, the slice header includes the parallax minimum value (minimum_disparity), the parallax maximum value (maximum_disparity), and the inter-camera distance (translation_x).

On the other hand, when the transmission flag is 1, and the type of the slice is inter-type, the slice header includes the difference-encoded result of the parallax minimum value (delta_minimum_disparity), the difference-encoded result of the parallax maximum value (delta_maximum_disparity), and the difference-encoded result of the inter-camera distance (delta_translation_x).

[Explanation about Processing of Encoding Device]

Figure 11:
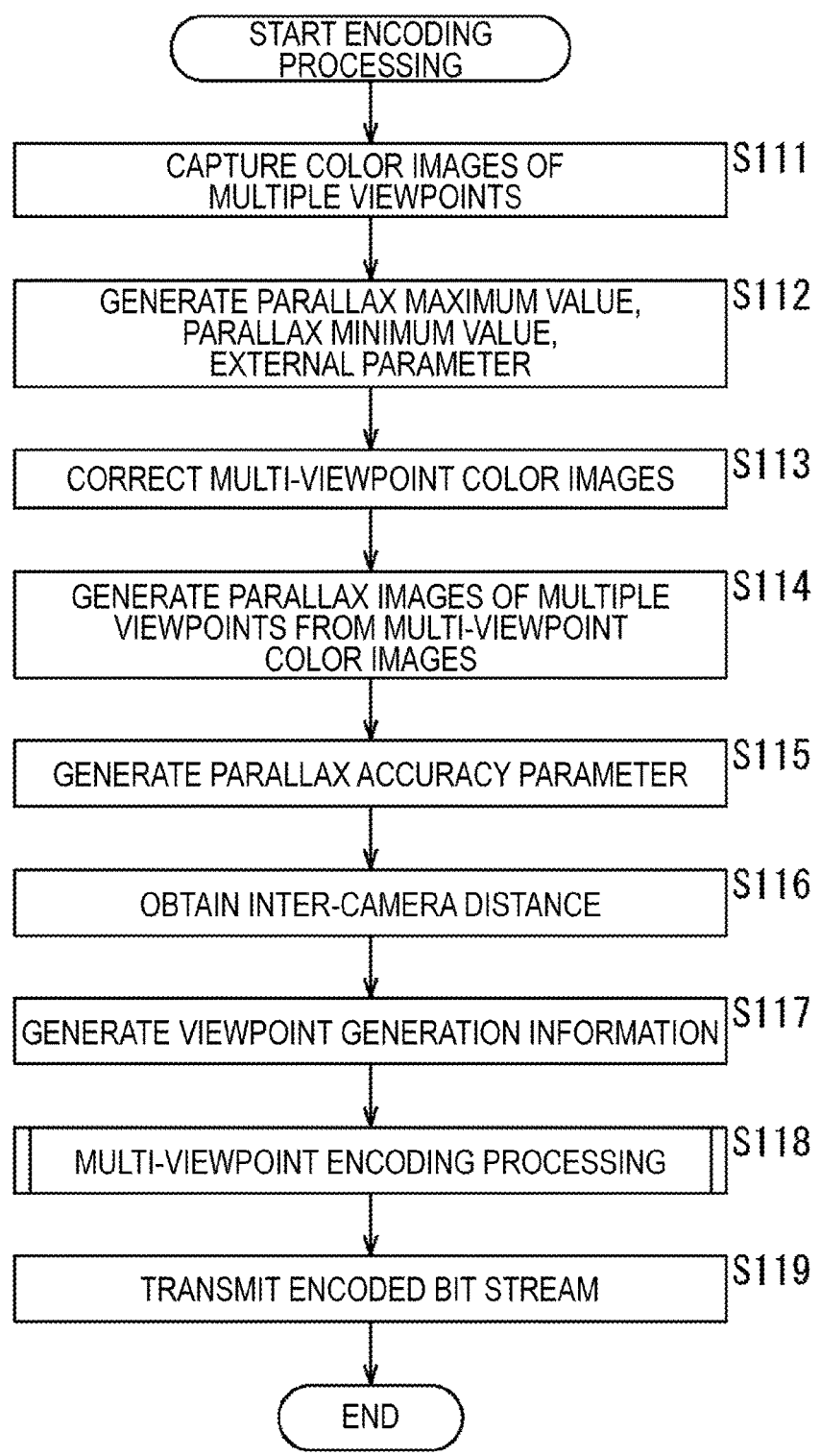
FIG. 11 is a flowchart explaining encoding processing of the encoding device of FIG. 1.

FIG. 11 is a flowchart explaining encoding processing of the encoding device 50 of FIG. 1.

In step S111 of FIG. 11, the multi-viewpoint color image image-capturing unit 51 of the encoding device 50 captures color images of multiple viewpoints, and provides them as multi-viewpoint color images to the multi-viewpoint color image correction unit 52.

In step S112, the multi-viewpoint color image image-capturing unit 51 generates the parallax maximum value, the parallax minimum value, and the external parameter. The multi-viewpoint color image image-capturing unit 51 provides the parallax maximum value, the parallax minimum value, and the external parameter to the viewpoint generation information generation unit 54, and provides the parallax maximum value and the parallax minimum value to the multi-viewpoint parallax image generation unit 53.

In step S113, the multi-viewpoint color image correction unit 52 performs color correction, brightness correction, distortion correction, and the like on the multi-viewpoint color images provided from the multi-viewpoint color image image-capturing unit 51. Accordingly, the focal distance of the multi-viewpoint color image image-capturing unit 51 in the corrected multi-viewpoint color image in the horizontal direction (X direction) is the same at all the viewpoints. The multi-viewpoint color image correction unit 52 provides the corrected multi-viewpoint color image to the multi-viewpoint parallax image generation unit 53 and the multi-viewpoint image encoding unit 55 as multi-viewpoint corrected color images.

In step S114, the multi-viewpoint parallax image generation unit 53 generates a multi-viewpoint parallax image from the multi-viewpoint correction color image provided by the multi-viewpoint color image correction unit 52, based on the parallax maximum value and the parallax minimum value provided from the multi-viewpoint color image image-capturing unit 51. Then, the multi-viewpoint parallax image generation unit 53 provides the generated multi-viewpoint parallax image, as the multi-viewpoint parallax image, to the multi-viewpoint image encoding unit 55.

In step S115, the multi-viewpoint parallax image generation unit 53 generates parallax accuracy parameters, and provides the parallax accuracy parameters to the viewpoint generation information generation unit 54.

In step S116, the viewpoint generation information generation unit 54 obtains the inter-camera distance based on the external parameters provided by the multi-viewpoint color image image-capturing unit 51.

In step S117, the viewpoint generation information generation unit 54 generates, as viewpoint generation information, the parallax maximum value and the parallax minimum value, and the inter-camera distance provided by the multi-viewpoint color image image-capturing unit 51, and the parallax accuracy parameter provided by the multi-viewpoint parallax image generation unit 53. The viewpoint generation information generation unit 54 provides the generated viewpoint generation information to the multi-viewpoint image encoding unit 55.

In step S118, the multi-viewpoint image encoding unit 55 performs the multi-viewpoint encoding processing for encoding the multi-viewpoint corrected color image provided by the multi-viewpoint color image correction unit 52 and the multi-viewpoint parallax image provided by the multi-viewpoint parallax image generation unit 53. The details of the multi-viewpoint encoding processing will be described with reference to FIG. 12 described later.

In step S119, the multi-viewpoint image encoding unit 55 transmits the encoded bit stream obtained as a result of the multi-viewpoint encoding processing, and terminates the processing.

Figure 12:
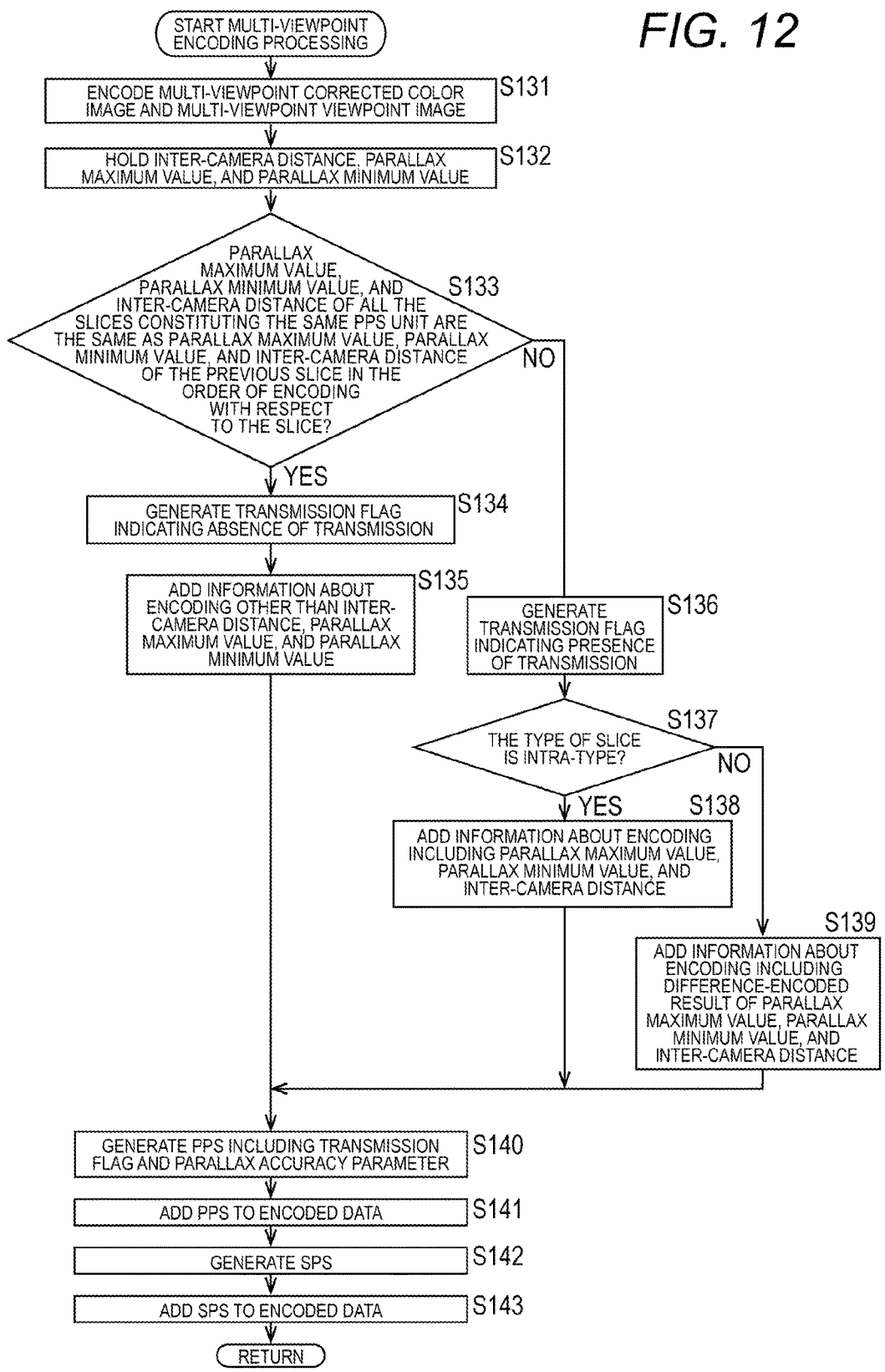
FIG. 12 is a flowchart explaining the details of the multi-viewpoint encoding processing of FIG. 11.

FIG. 12 is a flowchart explaining the multi-viewpoint encoding processing in step S118 of FIG. 11.

In step S131 of FIG. 12, the slice encoding unit 61 of the multi-viewpoint image encoding unit 55 (FIG. 5) encodes the multi-viewpoint corrected color image provided by the multi-viewpoint color image correction unit 52 and the multi-viewpoint parallax image provided by the multi-viewpoint parallax image generation unit 53 in units of slices. More specifically, the slice encoding unit 61 performs the color image encoding processing for encoding the multi-viewpoint correction color image according to the HEVC method in units of slices. The slice encoding unit 61 performs the parallax image encoding processing for encoding the multi-viewpoint parallax image according to the HEVC method in units of slices, using the parallax maximum value, the parallax minimum value, and the inter-camera distance from among the viewpoint generation information provided by the viewpoint generation information generation unit 54 of FIG. 1, and. The details of the parallax image encoding processing will be described with reference to FIGS. 13 and 14 described later. The slice encoding unit 61 provides the slice header encoding unit 62 with encoded data in units of slices obtained as a result of encoding.

In step S132, the slice header encoding unit 62 determines that the parallax maximum value, the parallax minimum value, and the inter-camera distance in the viewpoint generation information provided by the viewpoint generation information generation unit 54 are the parallax maximum value, the parallax minimum value, and the inter-camera distance of the slice of the current processing target, and holds them.

In step S133, the slice header encoding unit 62 determines whether or not the parallax maximum value, the parallax minimum value, and the inter-camera distance of all the slices constituting the same PPS unit are the same as the parallax maximum value, the parallax minimum value, and the inter-camera distance of the previous slice in the order of encoding with respect to the current slice.

When the inter-camera distance, the parallax maximum value, and the parallax minimum value are determined to be the same in step S133, the slice header encoding unit 62 generates a transmission flag indicating absence of transmission of the difference-encoded results of the parallax maximum value, the parallax minimum value, and the inter-camera distance, and provides it to the PPS encoding unit 63 in step S134.

In step S135, the slice header encoding unit 62 adds, as the slice header, information about encoding other than the inter-camera distance, the parallax maximum value, and the parallax minimum value of that slice to the encoded data of each slice constituting the same PPS unit which is the processing target of step S133. It should be noted that the information about encoding includes the motion information or the intra-prediction information provided by the slice encoding unit 61. Then, the slice header encoding unit 62 provides the PPS encoding unit 63 with the encoded data of each slice constituting the same PPS unit obtained as a result, and proceeds to processing in step S140.

On the other hand, when the inter-camera distance, the parallax maximum value, and the parallax minimum value are determined not to be the same in step S133, the slice header encoding unit 62 generates a transmission flag indicating presence of transmission of the difference-encoded results of the parallax maximum value, the parallax minimum value, and the inter-camera distance, and provides it to the PPS encoding unit 63 in step S136. The processing in steps S137 to S139 described later is performed for each slice constituting the same PPS unit which is the processing target of step S133.

In step S137, the slice header encoding unit 62 determines whether the type of the slice constituting the same PPS unit which is the processing target of step S133 is intra-type or not. When the type of the slice is determined to be the intra-type in step S137, the slice header encoding unit 62 adds information about encoding including the parallax maximum value, the parallax minimum value, and the inter-camera distance of that slice as the slice header to the encoded data of that slice in step S138. It should be noted that the information about encoding includes the motion information or the intra-prediction information provided by the slice encoding unit 61. Then, the slice header encoding unit 62 provides the PPS encoding unit 63 with the encoded data in units of slices obtained as a result, and proceeds to the processing in step S140.

On the other hand, when the type of the slice is determined not to be the intra-type in step S137, more specifically, when the type of the slice is determined to be the inter-type, the processing proceeds to step S139. In step S139, the slice header encoding unit 62 performs difference encoding on the inter-camera distance, the parallax maximum value, and the parallax minimum value of that slice, and adds, as the slice header, information about encoding including the difference-encoded result to that encoded data of that slice. It should be noted that the information about encoding includes the motion information or the intra-prediction information provided by the slice encoding unit 61. Then, the slice header encoding unit 62 provides the PPS encoding unit 63 with the encoded data in units of slices obtained as a result, and proceeds to the processing in step S140.

In step S140, the PPS encoding unit 63 generates PPS including the transmission flag provided from the slice header encoding unit 62 and the parallax accuracy parameter in the viewpoint generation information provided from the viewpoint generation information generation unit 54 of FIG. 1.

In step S141, the PPS encoding unit 63 adds, in the same PPS unit, the PPS to the encoded data in units of slices to which the slice header provided from the slice header encoding unit 62 is added, and provides it to the SPS encoding unit 64.

In step S142, the SPS encoding unit 64 generates SPS.

In step S143, the SPS encoding unit 64 adds, in units of sequences, the SPS to the encoded data to which the PPS provided from the PPS encoding unit 63 is added, and generates an encoded bit stream. Then, processing in step S118 in FIG. 11 is performed again, and subsequently proceeds to step S119.

Figure 13:
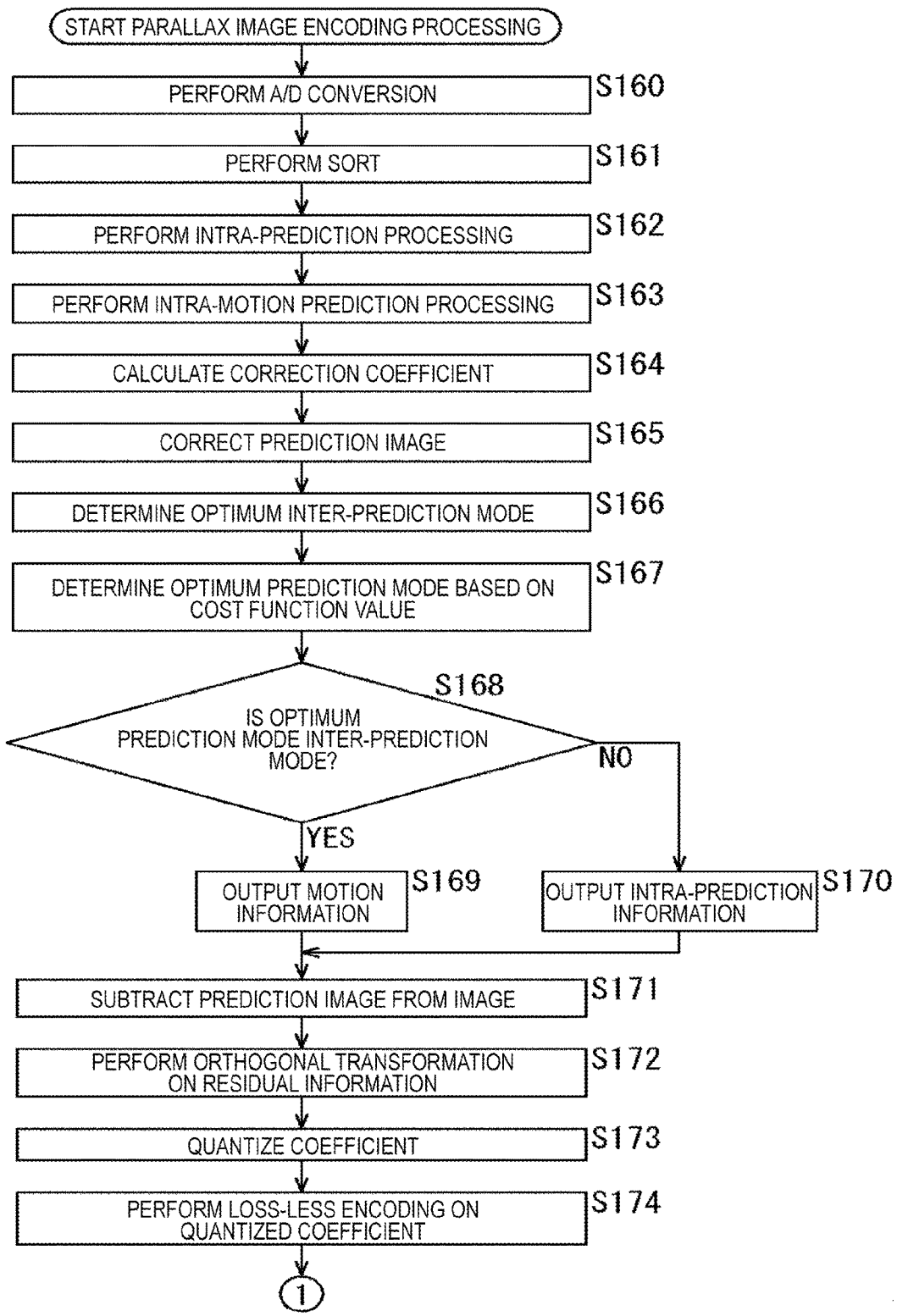
FIG. 13 is a flowchart explaining the details of the parallax image encoding processing of FIG. 12.
Figure 14:
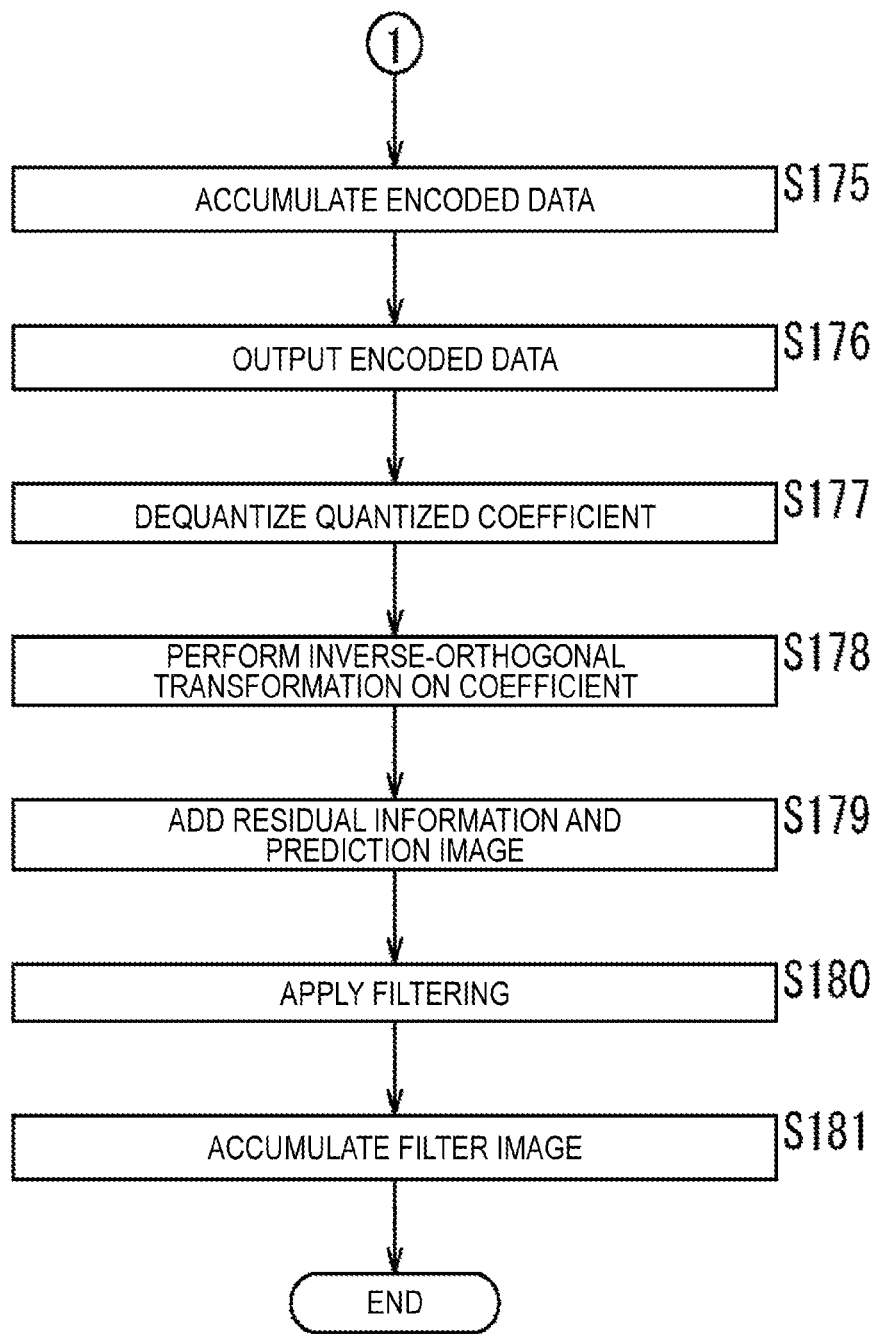
FIG. 14 is a flowchart explaining the details of the parallax image encoding processing of FIG. 12.

FIGS. 13 and 14 are flowcharts explaining the parallax image encoding processing of the slice encoding unit 61 of FIG. 5. The parallax image encoding processing is performed for each viewpoint.

In step S160 of FIG. 13, the A/D conversion unit 121 of the encoding unit 120 performs A/D conversion on parallax images received from the multi-viewpoint parallax image generation unit 53 in units of frames of predetermined viewpoints, and outputs the images to the screen sort buffer 122, so that the images are stored therein.

In step S161, the screen sort buffer 122 sorts the parallax images of frames in the order of display stored into the order for encoding in accordance with a GOP structure. The screen sort buffer 122 provides the sorted parallax images in units of frames to the arithmetic operation unit 123, the intra-prediction unit 133, and the motion prediction/compensation unit 134.

In step S162, the intra-prediction unit 133 uses the reference image provided by the addition unit 130 to perform intra-prediction in all the intra-prediction modes to be the candidates. At this occasion, the intra-prediction unit 133 calculates the cost function value for all the intra-prediction modes to be the candidates. Then, the intra-prediction unit 133 determines, as the optimum intra-prediction mode, the intra-prediction mode in which the cost function value is the minimum. The intra-prediction unit 133 provides the prediction image generated in the optimum intra-prediction mode and the corresponding cost function value to the selection unit 136.

In step S163, the motion prediction/compensation unit 134 performs the motion prediction/compensation processing based on the parallax image provided by the screen sort buffer 122 and the reference image provided by the frame memory 132.

More specifically, the motion prediction/compensation unit 134 performs the motion prediction processing in all the inter-prediction modes to be the candidates, based on the parallax image provided by the screen sort buffer 122 and the reference image provided by the frame memory 132, and generates motion vector. Based on the motion vector generated in the inter-prediction modes, the motion prediction/compensation unit 134 reads the reference image from the frame memory 132, thus performing motion compensation processing. The motion prediction/compensation unit 134 provides the prediction image generated as the result to the correction unit 135.

In step S164, the correction unit 135 calculates the correction coefficients based on the parallax maximum value, the parallax minimum value, and the inter-camera distance in the viewpoint generation information provided by the viewpoint generation information generation unit 54 of FIG. 1.

In step S165, the correction unit 135 uses the coefficients to correct the prediction image in each inter-prediction mode provided by the motion prediction/compensation unit 134.

In step S166, the correction unit 135 uses the corrected prediction image to calculate the cost function value in each inter-prediction mode, and determines the inter-prediction mode of which cost function value is the minimum as the optimum inter-measurement mode. Then, the correction unit 135 provides the cost function value and the prediction image generated in the optimum inter-prediction mode to the selection unit 136.

In step S167, the selection unit 136 determines, as the optimum prediction mode, one of the optimum intra-prediction mode and the optimum inter-prediction mode whichever the cost function value is the minimum, based on the cost function value provided by the correction unit 135 and the intra-prediction unit 133. Then, the selection unit 136 provides the prediction image in the optimum prediction mode to the arithmetic operation unit 123 and the addition unit 130.

In step S168, the selection unit 136 determines whether the optimum prediction mode is the optimum inter-prediction mode or not. When the optimum prediction mode is determined to be the optimum inter-prediction mode in step S168, the selection unit 136 notifies the correction unit 135 of the selection of the prediction image generated in the optimum inter-prediction mode.

The, in step S169, the correction unit 135 outputs the motion information to the slice header encoding unit 62 (FIG. 5), and proceeds to processing in step S171.

On the other hand, when the optimum prediction mode is determined not to be the optimum inter-prediction mode in step S168, and more specifically, when the optimum prediction mode is the optimum intra-prediction mode, then the selection unit 136 notifies the intra-prediction unit 133 of the selection of the prediction image generated in the optimum intra-prediction mode.

Then, in step S170, the intra-prediction unit 133 outputs the intra-prediction information to the slice header encoding unit 62, and subsequently processing proceeds to step S171.

In step S171, the arithmetic operation unit 123 subtracts the prediction image provided by the selection unit 136 from the parallax image provided by the screen sort buffer 122. The arithmetic operation unit 123 outputs the image obtained as a result of the subtraction, as the residual information, to the orthogonal transformation unit 124.

In step S172, orthogonal transformation unit 124 applies orthogonal transformation on the residual information provided from the arithmetic operation unit 123, and provides the thus-obtained coefficients to the quantization unit 125.

In step S173, the quantization unit 125 quantizes the coefficients supplied from the orthogonal transformation unit 124. The quantized coefficients are input into the lossless encoding unit 126 and the inverse quantization unit 128.

In step S174, the lossless encoding unit 126 performs lossless encoding on the quantized coefficients provided by the quantization unit 125.

In step S175 of FIG. 14, the lossless encoding unit 126 provides the encoded data obtained as a result of the lossless encoding to the accumulation buffer 127, and accumulates the data therein.

In step S176, the accumulation buffer 127 outputs the accumulated encoded data to the slice header encoding unit 62.

In step S177, the inverse quantization unit 128 inversely quantizes the quantized coefficients provided by the quantization unit 125.

In step S178, the inverse-orthogonal transformation unit 129 applies inverse-orthogonal transformation on the coefficients provided by the inverse quantization unit 128, and provides the residual information obtained as a result to the addition unit 130.

In step S179, the addition unit 130 adds the residual information provided by the inverse-orthogonal transformation unit 129 and the prediction image provided by the selection unit 136, and obtains the parallax image locally decoded. The addition unit 130 provides the obtained parallax image to the deblock filter 131, and provides the image as the reference image to the intra-prediction unit 133.

In step S180, the deblock filter 131 filters the locally decoded parallax image provided by the addition unit 130, thus eliminating block distortion.

In step S181, the deblock filter 131 provides the filtered parallax image to the frame memory 132, so that the image is accumulated therein. The parallax image accumulated in the frame memory 132 is output as the reference image to the motion prediction/compensation unit 134. Then, the processing is terminated.

The processing in steps S162 to S181 of FIGS. 13 and 14 is performed, for example, in a coding unit having a hierarchical structure. In order to simplify the explanation, in the parallax image encoding processing of FIGS. 13 and 14, the intra-prediction processing and the motion compensation processing are performed at all times, but in reality, any one of them may be performed according to the picture type and the like.

As described above, the encoding device 50 uses the information about the parallax image to correct the prediction image, and uses the corrected prediction image to encode the parallax image. More specifically, the encoding device 50 uses, as the information about the parallax image, the inter-camera distance, the parallax maximum value, and the parallax minimum value to correct the prediction image so that the parallax values become the same when the positions of the subject in the depth direction are the same in the prediction image and the parallax image, and uses the corrected prediction image to encode the parallax image. Therefore, difference between the parallax image and the prediction image generated based on the information about the parallax image is reduced, and the encoding efficiency is improved. In particular, when the information about the parallax image changes in each picture, the encoding efficiency is improved.

Instead of transmitting the correction coefficients as the information used for correction of the prediction image, the encoding device 50 transmits the inter-camera distance, the parallax maximum value, and the parallax minimum value used for calculation of the correction coefficients. In this case, the inter-camera distance, the parallax maximum value, and the parallax minimum value are a part of the viewpoint generation information. Therefore, the inter-camera distance, the parallax maximum value, and the parallax minimum value can be shared as a part of the information used for correction of the prediction image and the viewpoint generation information. As a result, the amount of information of the encoding bit stream can be reduced.

[Example of Configuration of First Embodiment of Decoding Device]

Figure 15:
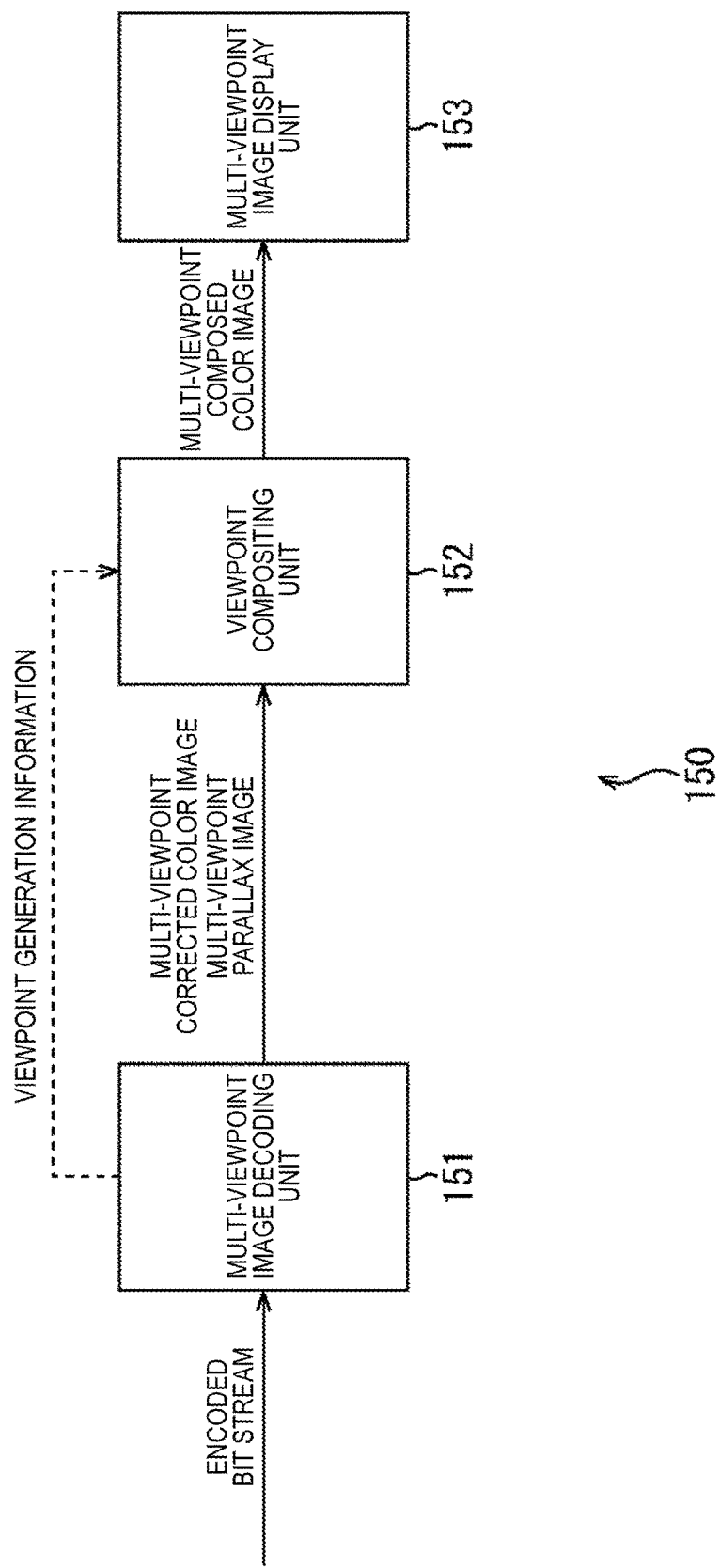
FIG. 15 is a block diagram illustrating an example of a configuration of the first embodiment of a decoding device to which the present technique is applied.

FIG. 15 is a block diagram illustrating an example of a configuration of the first embodiment of a decoding device, to which the present technique is applied, which decodes an encoded bit stream transmitted from the encoding device 50 of FIG. 1.

The decoding device 150 of FIG. 15 is constituted by a multi-viewpoint image decoding unit 151, a viewpoint compositing unit 152, and a multi-viewpoint image display unit 153. The decoding device 150 decodes the encoding bit stream transmitted from the encoding device 50, and uses the thus-obtained multi-viewpoint color image, the multi-viewpoint parallax image, and the viewpoint generation information to generate and display a color image of a display viewpoint.

More specifically, the multi-viewpoint image decoding unit 151 of the decoding device 150 receives the encoded bit stream transmitted from the encoding device 50 of FIG. 1. The multi-viewpoint image decoding unit 151 extracts the parallax accuracy parameter and the transmission flag from the PPS included in the received encoded bit stream. The multi-viewpoint image decoding unit 151 extracts the inter-camera distance, the parallax maximum value, and the parallax minimum value from the slice header of the encoded bit stream in accordance with the transmission flag. The multi-viewpoint image decoding unit 151 generates viewpoint generation information including the parallax accuracy parameter, the inter-camera distance, the parallax maximum value, and the parallax minimum value, and provides it to the viewpoint compositing unit 152.

The multi-viewpoint image decoding unit 151 decodes the encoded data of the multi-viewpoint corrected color image in units of slices included in the encoded bit stream in accordance with the method corresponding to the encoding method of the multi-viewpoint image encoding unit 55 of FIG. 1, and generates the multi-viewpoint corrected color image. The multi-viewpoint image decoding unit 151 functions as the decoding unit. The multi-viewpoint image decoding unit 151 decodes the encoded data of the multi-viewpoint parallax image included in the encoding bit stream according to a method corresponding to the encoding method of the multi-viewpoint image encoding unit 55 using the inter-camera distance, the parallax maximum value, and the parallax minimum value, and generate the multi-viewpoint parallax image. The multi-viewpoint image decoding unit 151 provides the multi-viewpoint corrected color images and the multi-viewpoint parallax image which are generated to the viewpoint compositing unit 152.

The viewpoint compositing unit 152 performs warping processing on the multi-viewpoint parallax image provided by the multi-viewpoint image decoding unit 151 for as many display viewpoints as the number of viewpoints corresponding to the multi-viewpoint image display unit 153 using the viewpoint generation information provided by the multi-viewpoint image decoding unit 151. More specifically, the viewpoint compositing unit 152 performs warping processing on the multi-viewpoint parallax image to warp the image according to the display viewpoints with the accuracy corresponding to the parallax accuracy parameter, based on the inter-camera distance, the parallax maximum value, the parallax minimum value, and the like included in the viewpoint generation information. The warping processing is for geometrically converting an image of a certain viewpoint into an image of another viewpoint. The display viewpoints include viewpoints other than the viewpoints corresponding to the multi-viewpoint color image.

The viewpoint compositing unit 152 performs warping processing on the multi-viewpoint corrected color images provided by the multi-viewpoint image decoding unit 151 to warp them according to the display viewpoints using the parallax image of display viewpoints obtained as a result of warping processing. The viewpoint compositing unit 152 provides the color images for the display viewpoints obtained as a result, to the multi-viewpoint image display unit 153 as the multi-viewpoint composed color images.

The multi-viewpoint image display unit 153 displays the multi-viewpoint composed color images provided by the viewpoint compositing unit 152 in such a manner that the viewable angle is different for each viewpoint. The viewer sees the images of two given viewpoints with their right and left eyes, thus seeing a 3D image from multiple viewpoints without wearing glasses.

As described above, the viewpoint compositing unit 152 performs warping processing on the multi-viewpoint corrected color images provided by the multi-viewpoint image decoding unit 81 to warp them according to the display viewpoints with the accuracy corresponding to the viewpoint accuracy parameter based on the parallax accuracy parameter, and therefore, it is not necessary for the viewpoint compositing unit 152 to wastefully perform the warping processing with a high degree of accuracy.

The viewpoint compositing unit 152 performs warping processing on the multi-viewpoint parallax image into the display viewpoint based on the inter-camera distance, and therefore, when the parallax corresponding to the parallax value of the multi-viewpoint parallax image having been subjected to the warping processing is not in an appropriate range, the parallax value can be corrected to a value corresponding to parallax of an appropriate range based on the inter-camera distance.

[Example of Configuration of Multi-Viewpoint Image Decoding Unit]

Figure 16:
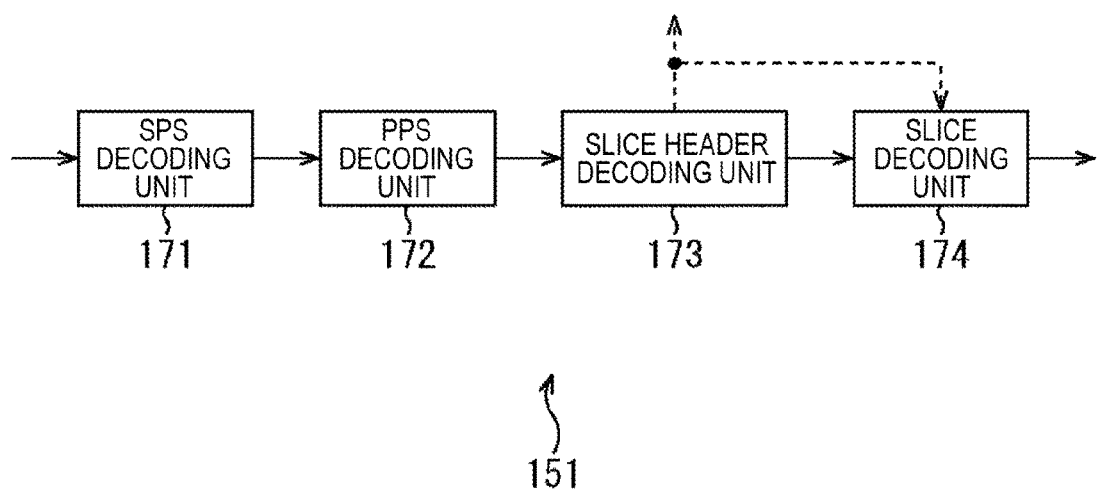
FIG. 16 is a block diagram illustrating an example of a configuration of the multi-viewpoint image decoding unit of FIG. 15.

FIG. 16 is a block diagram illustrating an example of a configuration of the multi-viewpoint image decoding unit 151 of FIG. 15.

The multi-viewpoint image decoding unit 151 of FIG. 16 includes an SPS decoding unit 171, a PPS decoding unit 172, a slice header decoding unit 173, and a slice decoding unit 174.

The SPS decoding unit 171 of the multi-viewpoint image decoding unit 151 functions as a receiving unit, and receives the encoded bit stream transmitted from the encoding device 50 of FIG. 1, and extracts the SPS in the encoded bit stream. The SPS decoding unit 171 provides the PPS decoding unit 172 with the extracted SPS and the encoded bit stream other than the SPS.

The PPS decoding unit 172 extracts the PPS from the encoded bit stream other than the SPS provided from the SPS decoding unit 171. The PPS decoding unit 172 provides the slice header decoding unit 173 with the extracted PPS and SPS, the encoded bit stream other than the SPS and the PPS.

The slice header decoding unit 173 extracts a slice header from the encoded bit stream other than the SPS and the PPS provided from the PPS decoding unit 172. When the transmission flag included in the PPS provided by the PPS decoding unit 172 is "1" indicating presence of transmission, the slice header decoding unit 173 holds the inter-camera distance, the parallax maximum value, and the parallax minimum value included in the slice header, or updates the inter-camera distance, the parallax maximum value, and the parallax minimum value which are held therein based on the difference-encoded result of the inter-camera distance, the parallax maximum value, and the parallax minimum value. The slice header decoding unit 173 generates viewpoint generation information from the inter-camera distance, the parallax maximum value, and the parallax minimum value, which are held, and the parallax accuracy parameter included in the PPS, and provides it to the viewpoint compositing unit 152.

Further, the slice header decoding unit 173 provides the slice decoding unit 174 with information other than information about the SPS, the PPS, the inter-camera distance, the parallax maximum value, the parallax minimum value of the slice header, and the encoded data in units of slices which is the encoded bit stream other than the SPS, the PPS, and the slice header. The slice header decoding unit 173 provides the inter-camera distance, the parallax maximum value, and the parallax minimum value to the slice decoding unit 174.

The slice decoding unit 174 decodes the encoded data of the multiplexed color image in units of slices in accordance with the method corresponding to the encoding method of the slice encoding unit 61 (FIG. 5) based on information other than the inter-camera distance, the parallax maximum value, and the parallax minimum value of the slice header, the SPS, and the PPS provided from the slice header decoding unit 173. The slice decoding unit 174 decodes the encoded data of the multiplexed color image in units of slices in accordance with the method corresponding to the encoding method of the slice encoding unit 61, based on information other than the inter-camera distance, the parallax maximum value, and the parallax minimum value of the slice header, the SPS, and the PPS, and based on the inter-camera distance, the parallax maximum value, and the parallax minimum value. The slice header decoding unit 173 provides the viewpoint compositing unit 152 of FIG. 15 with the multi-viewpoint corrected color image and the multi-viewpoint parallax image obtained as a result of decoding.

[Example of Configuration of Slice Decoding Unit]

Figure 17:
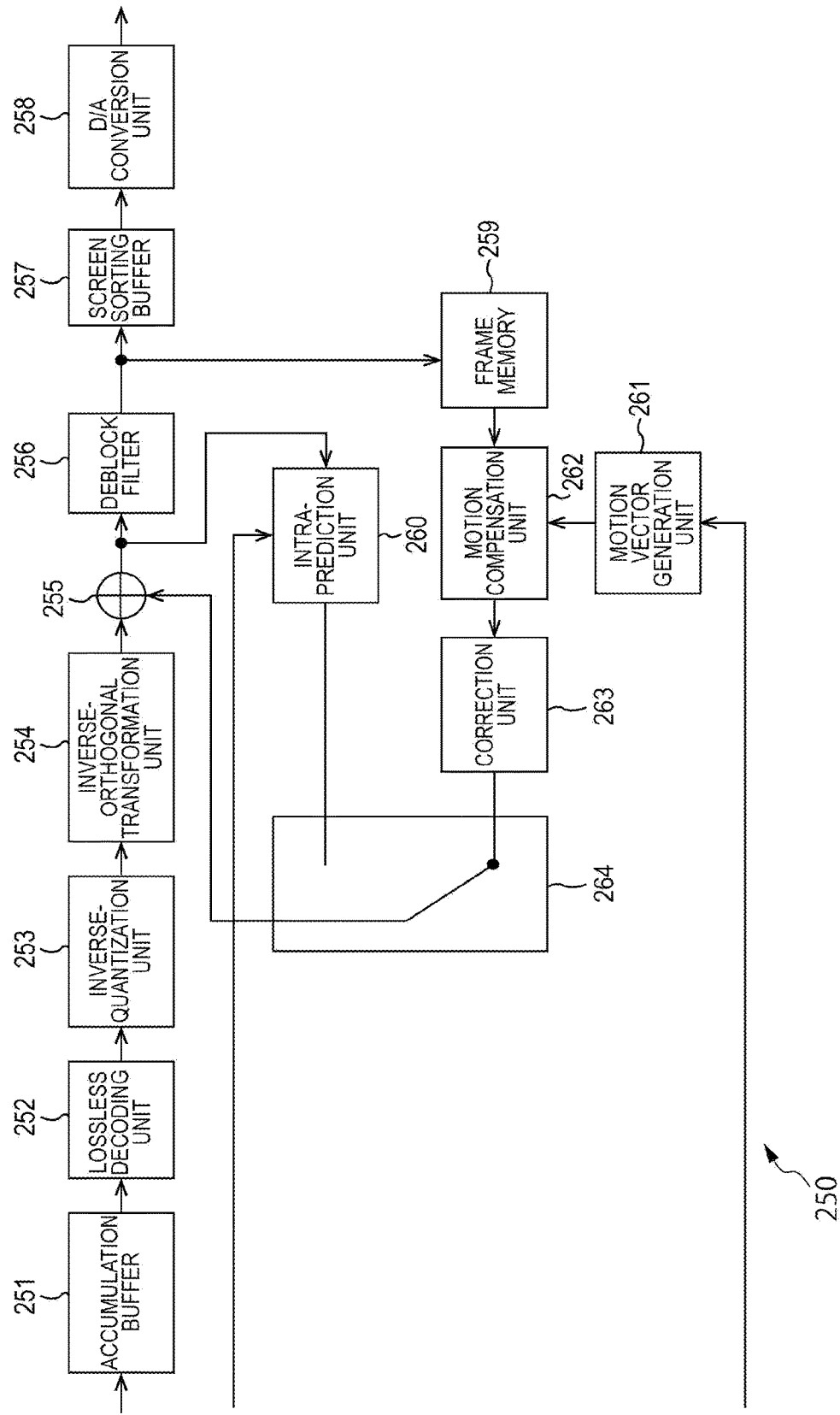
FIG. 17 is a block diagram illustrating an example of a configuration of a decoding unit.

FIG. 17 is a block diagram illustrating an example of a configuration of a decoding unit for decoding a parallax image of any given viewpoint in the slice decoding unit 174 of FIG. 16. More specifically, the decoding unit for decoding the multi-viewpoint parallax image in the slice decoding unit 174 is constituted by as many decoding units 250 of FIG. 17 as the number of viewpoints.

The decoding unit 250 of FIG. 17 includes an accumulation buffer 251, a lossless decoding unit 252, an inverse quantization unit 253, an inverse-orthogonal transformation unit 254, an addition unit 255, a deblock filter 256, a screen sort buffer 257, a D/A conversion unit 258, a frame memory 259, an intra-prediction unit 260, a motion vectors generation unit 261, a motion compensation unit 262, a correction unit 263, and a switch 264.

The accumulation buffer 251 of the decoding unit 250 receives and accumulates encoded data of parallax images of a predetermined viewpoint in units of slices from the slice header decoding unit 173 of FIG. 16. The accumulation buffer 251 provides the accumulated encoded data to the lossless decoding unit 252.

The lossless decoding unit 252 applies lossless decoding such as arithmetic decoding and variable length decoding to the encoded data given by the accumulation buffer 251, thus obtaining quantized coefficients. The lossless decoding unit 252 provides the quantized coefficients to the inverse quantization unit 253.

The inverse quantization unit 253, the inverse-orthogonal transformation unit 254, the addition unit 255, the deblock filter 256, the frame memory 259, the intra-prediction unit 260, the motion compensation unit 262, and the correction unit 263 perform the same processing as that of the inverse quantization unit 128, the inverse-orthogonal transformation unit 129, the addition unit 130, the deblock filter 131, the frame memory 132, the intra-prediction unit 133, the motion prediction/compensation unit 134, and the correction unit 135 of FIG. 6, so that the parallax image of the predetermined viewpoint is decoded.

More specifically, the inverse quantization unit 253 inversely quantizes the quantized coefficients provided by the lossless decoding unit 252, and provides the thus-obtained coefficients to the inverse-orthogonal transformation unit 254.

The inverse-orthogonal transformation unit 254 applies inverse-orthogonal transformation such as inverse-discrete cosine transform and inverse-Karhunen-Loeve transform on the coefficients provided by the inverse quantization unit 253, and provides the residual information obtained as a result to the addition unit 255.

The addition unit 255 functions as a decoding unit, and adds the residual information serving as the parallax image of the decoding target provided from the inverse-orthogonal transformation unit 254 and the prediction image provided by the switch 264, thus decoding the parallax image of the decoding target. The addition unit 255 provides the thus-obtained parallax image to the deblock filter 256, and provides the image as the reference image to the intra-prediction unit 260. When the switch 264 does not provided the prediction image, the addition unit 255 provides the parallax image which is the residual information provided from the inverse-orthogonal transformation unit 254 to the deblock filter 256, and provides the image as the reference image to the intra-prediction unit 260.

The deblock filter 256 filters the parallax image provided by the addition unit 255, thus eliminating block distortion. The deblock filter 256 provides the thus-obtained parallax image to the frame memory 259, so that the image is accumulated therein, and also provides the image to the screen sort buffer 257. The parallax image accumulated in the frame memory 259 is provided as the reference image to the motion compensation unit 262.

The screen sort buffer 257 stores the parallax image provided by the deblock filter 256 in units of frames. The screen sort buffer 257 sorts the parallax images stored in units of frames in the order for encoding into the original order of display, and provides the parallax images to the D/A conversion unit 258.

The D/A conversion unit 258 performs D/A conversion on the parallax image in units of frames provided from the screen sort buffer 257, and provides the image as the parallax images of the predetermined viewpoint to the viewpoint compositing unit 152 (FIG. 15).

The intra-prediction unit 260 performs intra-prediction in the optimum intra-prediction mode represented by the intra-prediction information provided from the slice header decoding unit 173 (FIG. 16) using the reference image provided by the addition unit 255, and generates a prediction image. Then, the intra-prediction unit 260 provides the prediction image to the switch 264.

The motion vectors generation unit 261 adds motion vector residual and the motion vector represented by the prediction vector index included in the motion information provided by the slice header decoding unit 173 in the motion vectors stored, and restores the motion vector. The motion vectors generation unit 261 stores the restored motion vector. The motion vectors generation unit 261 provides the restored motion vector, the optimum inter-prediction mode included in the motion information, and the like to the motion compensation unit 262.

The motion compensation unit 262 functions as a prediction image generation unit, and performs motion compensation processing by reading the reference image from the frame memory 259 based on the optimum inter-prediction mode and the motion vectors provided by the motion vectors generation unit 261. The motion compensation unit 262 provides the thus-generated prediction image to the correction unit 263.

Like the correction unit 135 of FIG. 6, the correction unit 263 generates the correction coefficients used to correct the prediction image, based on the parallax maximum value, the parallax minimum value, and the inter-camera distance provided by the slice header decoding unit 173 of FIG. 16. Like the correction unit 135, the correction unit 263 corrects the prediction image in the optimum inter-prediction mode provided by the motion compensation unit 262 using the correction coefficients. The correction unit 263 provides the corrected prediction image to the switch 264.

When the intra-prediction unit 260 provides the prediction image, the switch 264 provides the prediction image thereof to the addition unit 255. When the motion compensation unit 262 provides the prediction image, the switch 264 provides the prediction image thereof to the addition unit 255.

[Explanation about Processing of Decoding Device]

Figure 18:
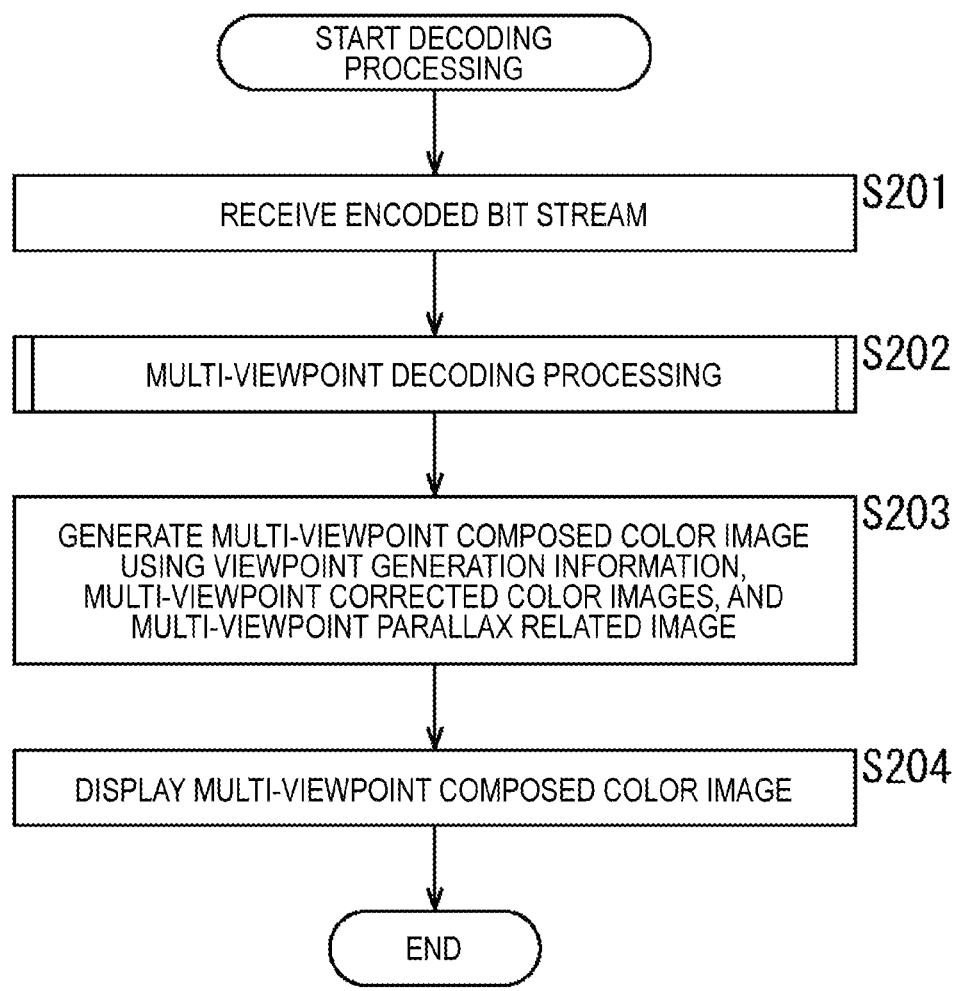
FIG. 18 is a flowchart explaining decoding processing of the decoding device 150 of FIG. 15.

FIG. 18 is a flowchart explaining decoding processing of the decoding device 150 of FIG. 15. This decoding processing is started, for example, when the encoded bit stream is transmitted from the encoding device 50 of FIG. 1.

In step S201 of FIG. 18, the multi-viewpoint image decoding unit 151 of the decoding device 150 receives the encoded bit stream transmitted from the encoding device 50 of FIG. 1.

In step S202, the multi-viewpoint image decoding unit 151 performs the multi-viewpoint decoding processing for decoding the received encoded bit stream. The details of the multi-viewpoint decoding processing will be described with reference to FIG. 19 described later.

In step S203, the viewpoint compositing unit 152 functions as a generation unit, and generates the multi-viewpoint composed color image using the viewpoint generation information, the multi-viewpoint corrected color images, and the multi-viewpoint parallax image provided by the multi-viewpoint image decoding unit 151.

In step S204, the multi-viewpoint image display unit 153 displays the multi-viewpoint composed color image provided by the viewpoint compositing unit 152 in such a manner that the viewable angle is different for each viewpoint, and terminates the processing.

Figure 19:
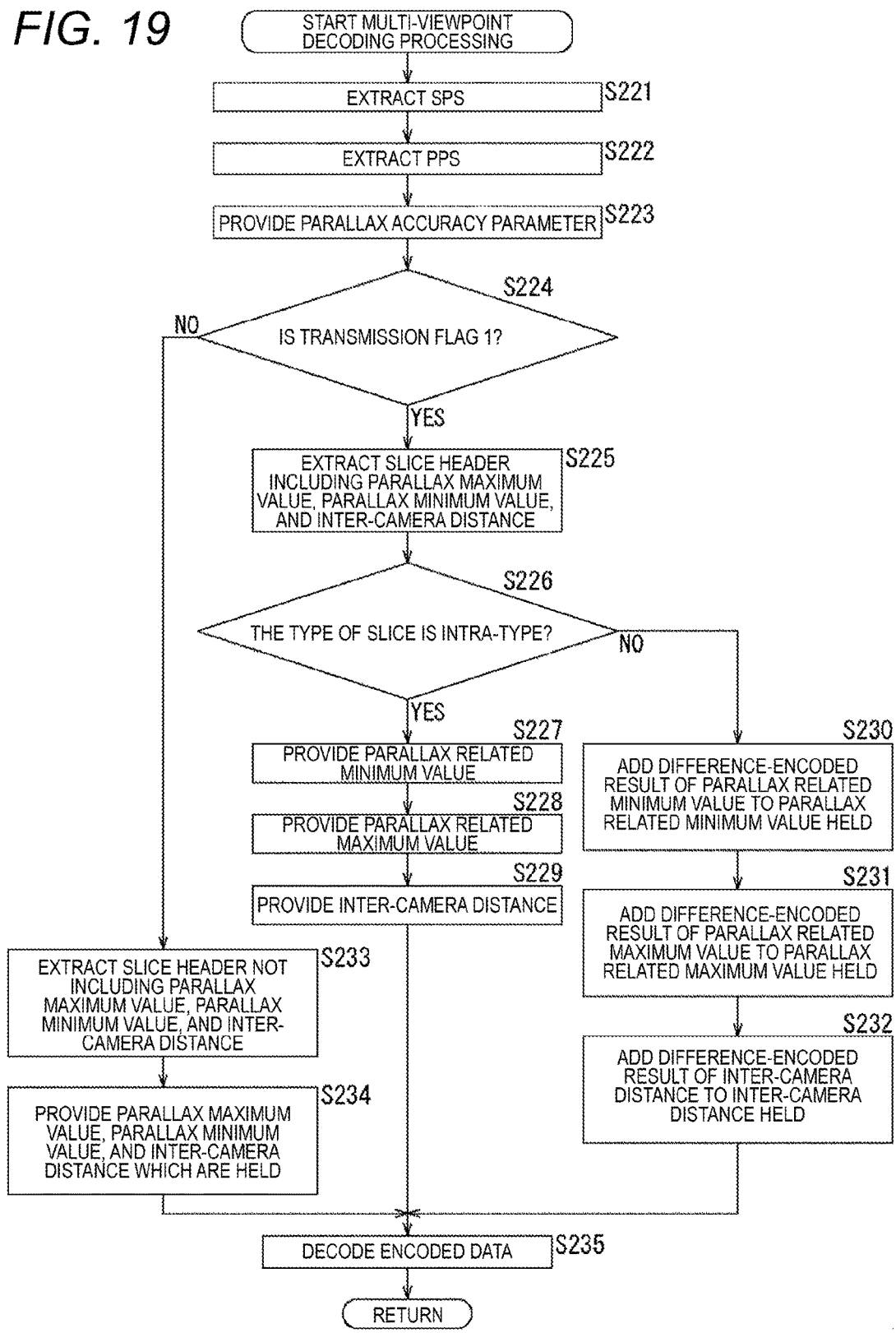
FIG. 19 is a flowchart explaining the details of the multi-viewpoint decoding processing of FIG. 18.

FIG. 19 is a flowchart explaining the details of multi-viewpoint decoding processing in step S202 of FIG. 18.

In step S221 of FIG. 19, the SPS decoding unit 171 of the multi-viewpoint image decoding unit 151 (FIG. 16) extracts the SPS from the received encoded bit stream. The SPS decoding unit 171 provides the PPS decoding unit 172 with the extracted SPS and the encoded bit stream other than the SPS.

In step S222, the PPS decoding unit 172 extracts the PPS from the encoded bit stream other than the SPS provided from the SPS decoding unit 171. The PPS decoding unit 172 provides the slice header decoding unit 173 with the PPS and the SPS which are extracted, and the encoded bit stream other than the SPS and the PPS.

In step S223, the slice header decoding unit 173 provides the parallax accuracy parameter included in the PPS provided from the PPS decoding unit 172 to the viewpoint compositing unit 152 as a portion of the viewpoint generation information.

In step S224, the slice header decoding unit 173 determines whether or not the transmission flag included in the PPS provided by the PPS decoding unit 172 is "1" indicating presence of transmission. It should be noted that the subsequent processing in steps S225 to S234 is done in units of slices.

When the transmission flag is determined to be "1" indicating presence of transmission in step S224, the processing proceeds to step S225. In step S225, the slice header decoding unit 173 extracts the parallax maximum value, the parallax minimum value, and the inter-camera distance, or the slice header including the difference-encoded result of the parallax maximum value, the parallax minimum value, and the inter-camera distance, from the encoded bit stream other than the SPS and the PPS provided from the PPS decoding unit 172.

In step S226, the slice header decoding unit 173 determines whether the type of the slice is intra-type or not. When the type of the slice is determined to be the intra-type in step S226, the processing proceeds to step S227.

In step S227, the slice header decoding unit 173 holds the parallax minimum value included in the slice header extracted in step S225, and provides it to the viewpoint compositing unit 152 as a portion of the viewpoint generation information.

In step S228, the slice header decoding unit 173 holds the parallax minimum value included in the slice header extracted in step S225, and provides it to the viewpoint compositing unit 152 as a portion of the viewpoint generation information.

In step S229, the slice header decoding unit 173 holds the inter-camera distance included in the slice header extracted in step S225, and provides it to the viewpoint compositing unit 152 as a portion of the viewpoint generation information. Then, the processing proceeds to step S235.

On the other hand, when the type of the slice is determined not to be the intra-type in step S226, more specifically, when the type of the slice is determined to be the inter-type, the processing proceeds to step S230.

In step S230, the slice header decoding unit 173 adds the difference-encoded result of the parallax minimum value included in the slice header extracted in step S225 to the held parallax minimum value. The slice header decoding unit 173 provides the parallax minimum value restored by adding operation to the viewpoint compositing unit 152 as a part of the viewpoint generation information.

In step S231, the slice header decoding unit 173 adds the difference-encoded result of the parallax minimum value included in the slice header extracted in step S225 to the held parallax minimum value. The slice header decoding unit 173 provides the parallax minimum value restored by adding operation to the viewpoint compositing unit 152 as a part of the viewpoint generation information.

In step S232, the slice header decoding unit 173 adds the difference-encoded result of the inter-camera distance included in the slice header extracted in step S225 to the held inter-camera distance. The slice header decoding unit 173 provides the inter-camera distance restored by adding operation to the viewpoint compositing unit 152 as a part of the viewpoint generation information. Then, the processing proceeds to step S235.

When the transmission flag is determined not to be "1" indicating presence of transmission in step S224, i.e., the transmission flag is determined to be "0" indicating absence of transmission, the processing proceeds to step S233.

In step S233, the slice header decoding unit 173 extracts the parallax maximum value, the parallax minimum value, and the inter-camera distance, and the slice header not including the difference-encoded result of the parallax maximum value, the parallax minimum value, and the inter-camera distance, from the encoded bit stream other than the SPS and the PPS provided from the PPS decoding unit 172.

In step S234, the slice header decoding unit 173 determines that the parallax maximum value, the parallax minimum value, and the inter-camera distance which are held, i.e., the parallax maximum value, the parallax minimum value, and the inter-camera distance of the previous slice in the order of encoding, are the parallax maximum value, the parallax minimum value, and the inter-camera distance of the slice of the processing target, whereby the parallax maximum value, the parallax minimum value, and the inter-camera distance of the slice of the processing target are restored. Then, the slice header decoding unit 173 provides the parallax maximum value, the parallax minimum value, and the inter-camera distance thus restored to the viewpoint compositing unit 152 as a portion of the viewpoint generation information, and proceeds to the processing in step S235.

In step S235, the slice decoding unit 174 decodes the encoded data in units of slices in accordance with the method corresponding to the encoding method of the slice encoding unit 61 (FIG. 5). More specifically, the slice decoding unit 174 decodes the encoded data of the multi-viewpoint color image in units of slices in accordance with the method corresponding to the encoding method of the slice encoding unit 61 based on the SPS, the PPS and the slice header other than the information about the inter-camera distance, the parallax maximum value, and the parallax minimum value, given by the slice header decoding unit 173. The slice decoding unit 174 performs parallax image decoding processing for decoding the encoded data of the multi-viewpoint correction image in units of slices in accordance with the method corresponding to the encoding method of the slice encoding unit 61, based on the SPS, the PPS, and the slice header other than the information about the inter-camera distance, the parallax maximum value, and the parallax minimum value, given by the slice header decoding unit 173, and the inter-camera distance, the parallax maximum value, and the parallax minimum value. The details of the parallax image decoding processing will be described with reference to FIG. 20 described later. The slice header decoding unit 173 provides the viewpoint compositing unit 152 of FIG. 15 with the multi-viewpoint corrected color image and the multi-viewpoint parallax image obtained as a result of decoding.

Figure 20:
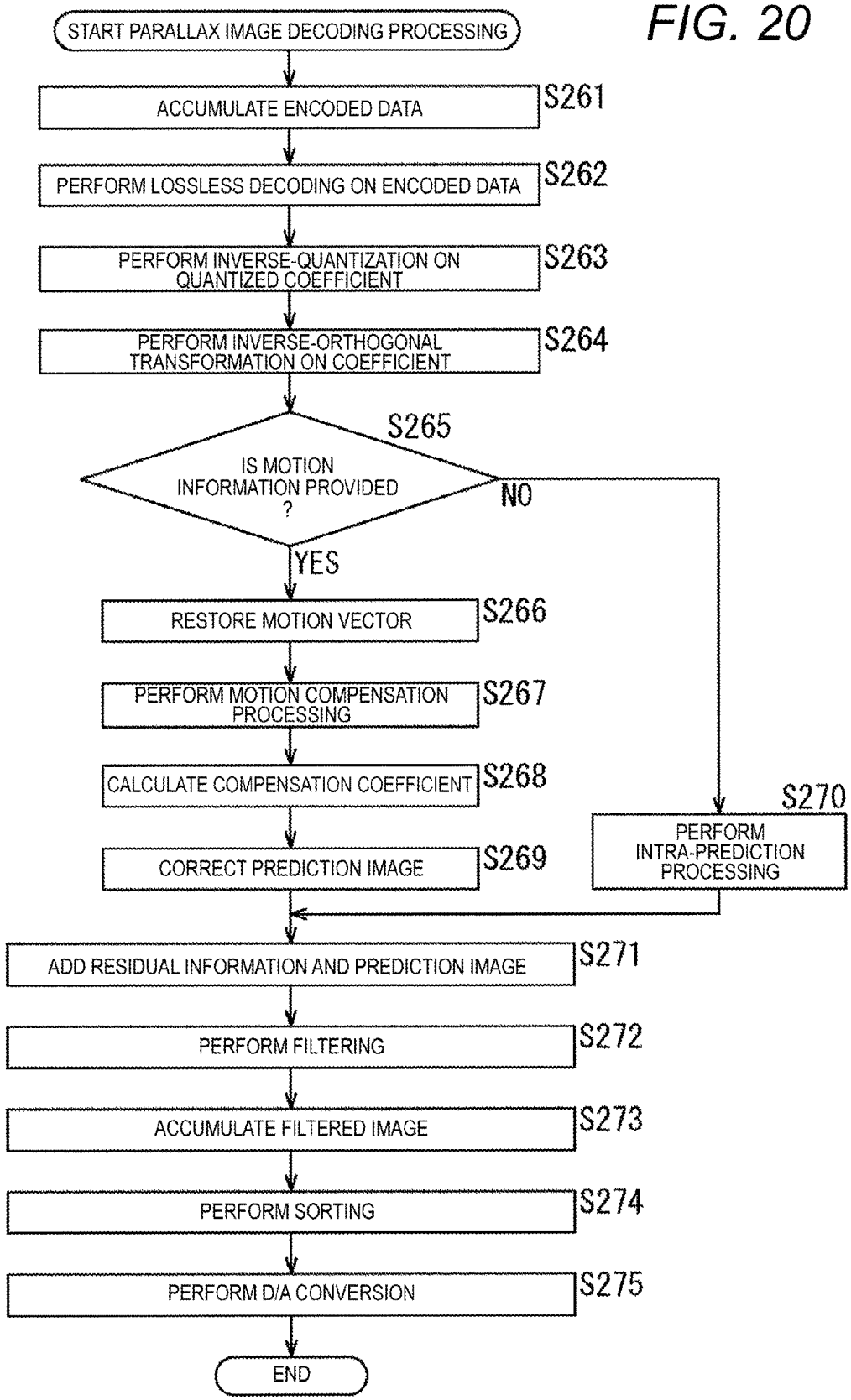
FIG. 20 is a flowchart explaining the details of the parallax image decoding processing of FIG. 16.

FIG. 20 is a flowchart explaining the details of parallax image decoding processing performed by the slice decoding unit 174 of FIG. 16. This parallax image decoding processing is performed for each viewpoint.

In step S261 of FIG. 20, the accumulation buffer 251 of the decoding unit 250 receives and accumulates encoded data of parallax images of a predetermined viewpoint in units of slices from the slice header decoding unit 173 of FIG. 16. The accumulation buffer 251 provides the accumulated encoded data to the lossless decoding unit 252.

In step S262, the lossless decoding unit 252 performs the lossless decoding on the encoded data provided by the accumulation buffer 251, and provides the thus-obtained quantized coefficients to the inverse quantization unit 253.

In step S263, the inverse quantization unit 253 inversely quantizes the quantized coefficients given by the lossless decoding unit 252, and provides the thus-obtained coefficients to the inverse-orthogonal transformation unit 254.

In step S264, the inverse-orthogonal transformation unit 254 performs inverse-orthogonal transformation on the coefficients given by the inverse quantization unit 253, and provides the thus-obtained residual information to the addition unit 255.

In step S265, the motion vectors generation unit 261 determines whether the slice header decoding unit 173 of FIG. 16 provides the motion information or not. When the slice header decoding unit 173 is determined to provide the motion information in step S265, the processing in step S266 is performed.

In step S266, the motion vectors generation unit 261 restores and holds the motion vectors based on the held motion vectors and the motion information. The motion vectors generation unit 261 provides, e.g., the restored motion vectors, the optimum inter-prediction mode included in the motion information to the motion compensation unit 262.

In step S267, the motion compensation unit 262 performs motion compensation processing by reading the reference image from the frame memory 259 based on the optimum inter-prediction mode and the motion vectors provided by the motion vectors generation unit 261. The motion compensation unit 262 provides the prediction image generated as the result of the motion compensation processing to the correction unit 263.

In step S268, like the correction unit 135 of FIG. 6, the correction unit 263 calculates the correction coefficients, based on the parallax maximum value, the parallax minimum value, and the inter-camera distance provided by the slice header decoding unit 173 of FIG. 16.

In step S269, like the correction unit 135, the correction unit 263 uses the correction coefficients to correct the prediction image in the optimum inter-prediction mode provided by the motion compensation unit 262. The correction unit 263 provides the corrected prediction image via the switch 264 to the addition unit 255, and the processing proceeds to step S271.

On the other hand, when the motion information is determined not to be provided in step S265, and more specifically, when the intra-prediction information is provided from the slice header decoding unit 173 to the intra-prediction unit 260, the processing proceeds to step S270.

In step S270, the intra-prediction unit 260 performs intra-prediction processing in the optimum intra-prediction mode represented by the intra-prediction information provided from the slice header decoding unit 173 using the reference image provided by the addition unit 255. The intra-prediction unit 260 provides the prediction image generated as the result to the addition unit 255 via the switch 264, and subsequently, the processing proceeds to step S271.

In step S271, the addition unit 255 adds the residual information provided by the inverse-orthogonal transformation unit 254 and the prediction image provided by the switch 264. The addition unit 255 provides the thus-obtained parallax image to the deblock filter 256, and provides the image as the reference image to the intra-prediction unit 260.

In step S272, the deblock filter 256 filters the parallax image provided by the addition unit 255, thus eliminating block distortion.

In step S273, the deblock filter 256 provides the filtered parallax image to the frame memory 259, so that the image is accumulated therein, and also provides the image to the screen sort buffer 257. The parallax image accumulated in the frame memory 259 is provided as the reference image to the motion compensation unit 262.

In step S274, the screen sort buffer 257 stores the parallax images stored in units of frames provided by the deblock filter 256, and sorts the stored parallax images in the order for encoding into the original order of display, and provides the parallax images to the D/A conversion unit 258.

In step S275, the D/A conversion unit 258 performs D/A conversion on the parallax image in units of frames provided from the screen sort buffer 257, and provides the image as the parallax images of the predetermined viewpoint to the viewpoint compositing unit 152 of FIG. 15.

As described above, the decoding device 150 receives the encoded data of the parallax images of which encoding efficiency is improved by performing encoding using the prediction image corrected using the information about the parallax image, and the encoded bit stream including the information about the parallax image. The decoding device 150 uses the information about the parallax image to correct the prediction image, and decodes the encoded data of the parallax image using the corrected prediction image using the corrected prediction image.

More specifically, the decoding device 150 received the encoded data encoded using the prediction image corrected using the inter-camera distance, the parallax maximum value, and the parallax minimum value as the information about the parallax image, and the inter-camera distance, the parallax maximum value, and the parallax minimum value. The decoding device 150 corrects the prediction image using the inter-camera distance, the parallax maximum value, and the parallax minimum value, and uses the corrected prediction image to decode the encoded data of the parallax image. Therefore, the decoding device 150 can decode the encoded data of the parallax images of which encoding efficiency is improved by performing encoding using the prediction image corrected using the information about the parallax image.

The encoding device 50 transmits, as the information used for correction of the prediction image, the parallax maximum value, the parallax minimum value, and the inter-camera distance in such a manner that they are included in the slice header. However, the transmission method is not limited thereto.

[Explanation about Transmission Method of Information Used for Correction of Prediction Image]

FIG. 21 is a table explaining transmission method of information used for correction of a prediction image.

The first transmission method of FIG. 21 is, as described above, the method for transmitting, as the information used for correction of the prediction image, the parallax maximum value, the parallax minimum value, and the inter-camera distance in such a manner that they are included in the slice header. In this case, the information used for correction of the prediction image and the viewpoint generation information can be shared, and the amount of information of the encoding bit stream can be reduced. However, the decoding device 150 needs to calculate the correction coefficients using the parallax maximum value, the parallax minimum value, and the inter-camera distance, and the processing load of the decoding device 150 is higher as compared with the second transmission method described later.

On the other hand, the second transmission method of FIG. 21 is the method for transmitting, as the information used for correction of the prediction image, the correction coefficients in such a manner than they are included in the slice header. In this case, the parallax maximum value, the parallax minimum value, and the inter-camera distance are not used for correction of the prediction image, and therefore, they are transmitted as a part of the viewpoint generation information, for example, in such a manner that they are included in the SEI (Supplemental Enhancement Information) which need not be looked up during encoding. In the second transmission method, the correction coefficients are transmitted, and therefore, the decoding device 150 does not need to calculate the correction coefficients, and the processing load of the decoding device 150 is less than that of the first transmission method. However, since the correction coefficients are newly transmitted, and therefore, the amount of information of the encoding bit stream increases.

In the above explanation, the prediction image is corrected using the parallax maximum value, the parallax minimum value, and the inter-camera distance. Alternatively, the prediction image can be corrected also using other information about the parallax (for example, image-capturing position information representing the image-capturing position in the depth direction by multi-viewpoint color image image-capturing unit 51).

In this case, according to a third transmission method of FIG. 21, additional correction coefficient which is a correction coefficient generated using the parallax maximum value, the parallax minimum value, and the inter-camera distance and other information about the parallax are transmitted as information used for correction of the parallax image in such a manner than they are included in the slice header. As described above, when the prediction image is corrected also using the information about the parallax other than the parallax maximum value, the parallax minimum value, and the inter-camera distance, the difference of the parallax image and the prediction image based on the information about the parallax is further reduced, whereby the encoding efficiency can be improved. However, since the additional correction coefficient is newly transmitted, the amount of information of the encoding bit stream increases as compared with the first transmission method. In addition, the decoding device 150 needs to calculate the correction coefficients using the parallax maximum value, the parallax minimum value, and the inter-camera distance, and therefore, the processing load of the decoding device 150 is higher as compared with the second transmission method.

Figure 22:
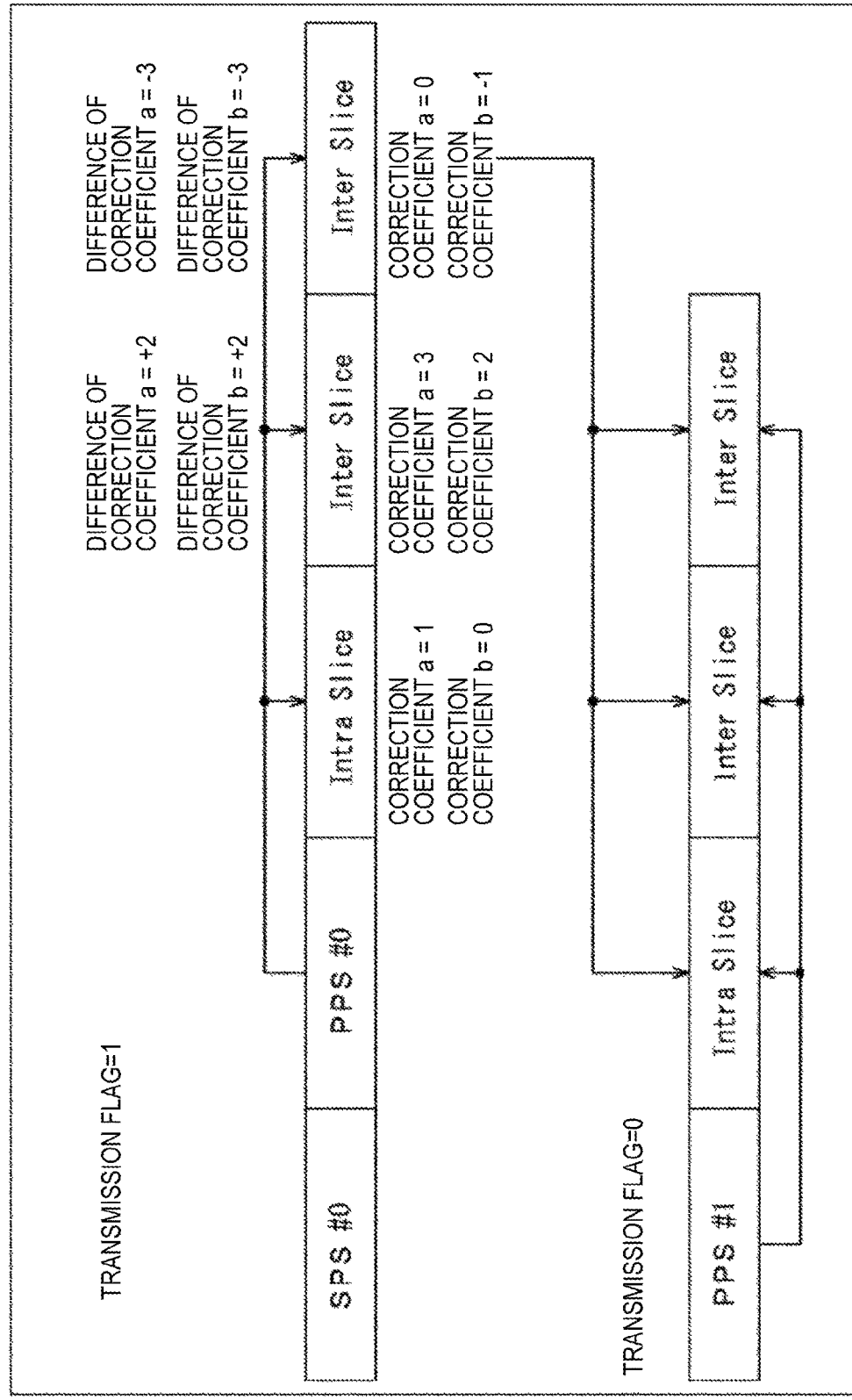
FIG. 22 is a diagram illustrating an example of a configuration of an encoded bit stream according to a second transmission method.

FIG. 22 is a diagram illustrating an example of a configuration of an encoded bit stream in a case where the information used for correction of the prediction image is transmitted according to the second transmission method.

In the example of FIG. 22, the correction coefficients of one intra-type slice and the two inter-type slices constituting the same PPS unit of the PPS #0 are not the same as the correction coefficients, respectively, of the previous slice in the order of encoding. Therefore, the PPS #0 includes a transmission flag "1" indicating presence of transmission. In this case, the transmission flag is a flag that indicates presence/absence of transmission of correction coefficients.

In the example of FIG. 22, the correction coefficient a of the intra-type slice constituting the same PPS unit of the PPS #0 is 1, and the correction coefficient b thereof is 0. Therefore, the slice header of the slice thereof includes the correction coefficient a "1" and the correction coefficient b "0".

Further, in the example of FIG. 22, the correction coefficient a of the first inter-type slice constituting the same PPS unit of the PPS #0 is 3, and the correction coefficient b is 2. Therefore, the slice header of the slice includes, as the difference-encoded result of the correction coefficients, difference "+2" which is obtained by subtracting the correction coefficient a "1" of the intra-type slice which is arranged before the slice in question in the order of encoding from the correction coefficient a "3" of the slice in question. Likewise, the difference "+2" of the correction coefficient b is included as the difference encoding result of the correction coefficient b.

Further, in the example of FIG. 22, the correction coefficient a of the second inter-type slice constituting the same PPS unit of the PPS #0 is 0, and the correction coefficient b is −1. Therefore, the slice header of the slice includes, as the difference-encoded result of the correction coefficients, difference "−3" which is obtained by subtracting the correction coefficient a "3" of the first intra-type slice which is arranged before the slice in question in the order of encoding from the correction coefficient a "0" of the slice in question. Likewise, the difference "−3" of the correction coefficient b is included as the difference encoding result of the correction coefficient b.

In the example of FIG. 22, the correction coefficients of one intra-type slice and the two inter-type slices constituting the same PPS unit of the PPS #1 are the same as the correction coefficients, respectively, of the previous slice in the order of encoding. Therefore, the PPS #1 includes a transmission flag "0" indicating absence of transmission.

Figure 23:
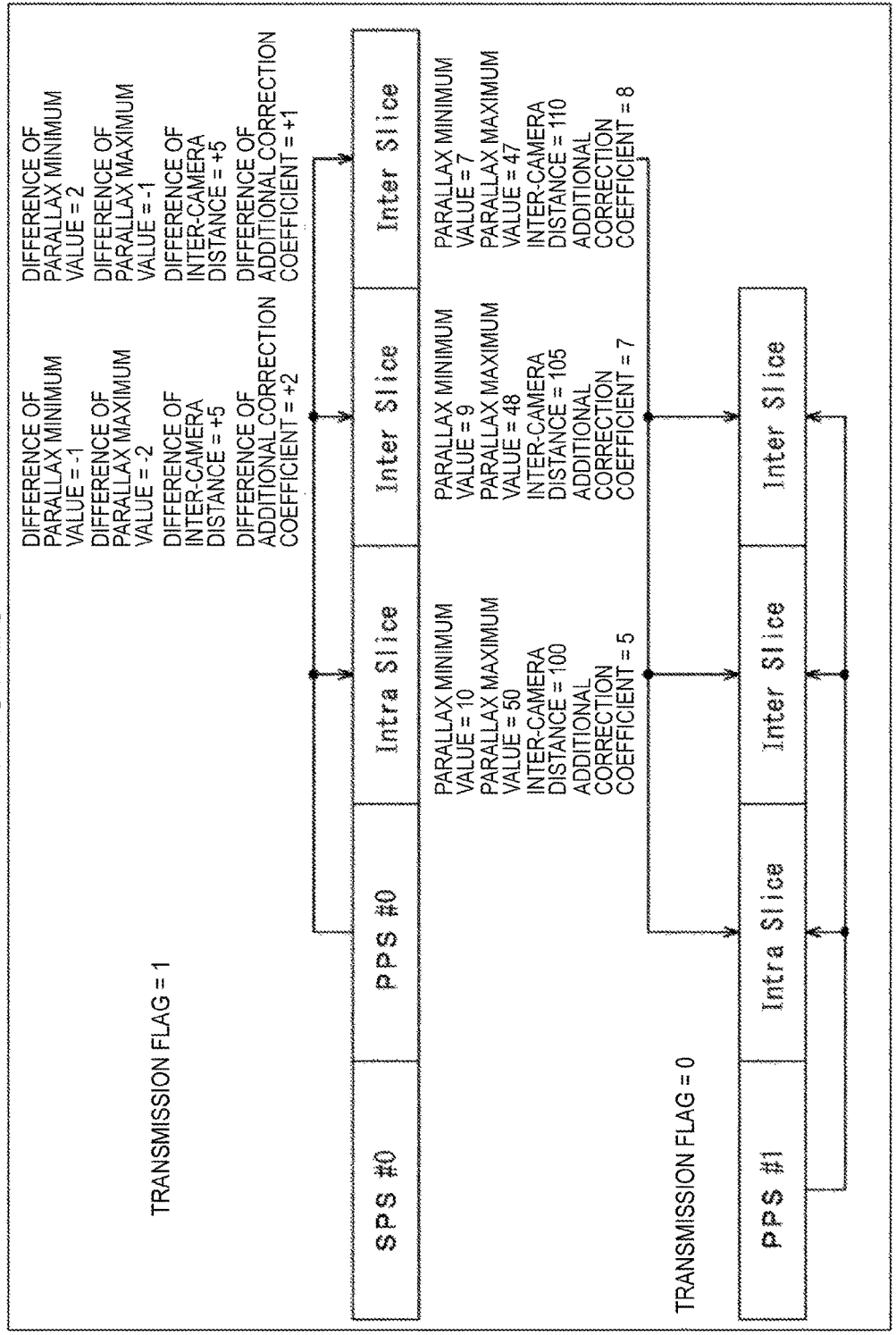
FIG. 23 is a diagram illustrating an example of a configuration of an encoded bit stream according to a third transmission method.

FIG. 23 is a diagram illustrating an example of a configuration of an encoded bit stream in a case where the information used for correction of the prediction image is transmitted according to the third transmission method.

In the example of FIG. 23, parallax minimum value, parallax maximum value, inter-camera distance, and additional correction coefficients of one intra-type slice and the two inter-type slices constituting the same PPS unit of the PPS #0 are not the same as the parallax minimum value, the parallax maximum value, the inter-camera distance, and the additional correction coefficients, respectively, of the previous slice in the order of encoding. Therefore, the PPS #0 includes a transmission flag "1" indicating presence of transmission. In this case, the transmission flag is a flag that indicates presence/absence of transmission of the parallax minimum value, the parallax maximum value, the inter-camera distance, and the additional correction coefficients.

In the example of FIG. 23, the parallax minimum value, the parallax maximum value, and the inter-camera distance of the slice constituting the same PPS unit of the PPS #0 is the same as the case of FIG. 7, and the information about the parallax minimum value, the parallax maximum value, and the inter-camera distance included in the slice header of each slice is the same as the case of FIG. 7, and the explanation thereabout is omitted.

In the example of FIG. 23, the additional correction coefficient of the intra-type slice constituting the same PPS unit of the PPS #0 is 5. Therefore, the slice header of the slice thereof includes the additional correction coefficients "5".

Further, in the example of FIG. 23, the additional correction coefficient of the first inter-type slice constituting the same PPS unit of the PPS #0 is 7. Therefore, the slice header of the slice includes, as the difference-encoded result of the additional correction coefficient, difference "+2" which is obtained by subtracting the additional correction coefficient "5" of the intra-type slice which is arranged before the slice in question in the order of encoding from the additional correction coefficient "7" of the slice in question.

Further, in the example of FIG. 23, the additional correction coefficient of the second inter-type slice constituting the same PPS unit of the PPS #0 is 8. Therefore, the slice header of the slice includes, as the difference-encoded result of the additional correction coefficient, difference "+1" which is obtained by subtracting the additional correction coefficient "7" of the first intra-type slice which is arranged before the slice in question in the order of encoding from the additional correction coefficient "8" of the slice in question.

In the example of FIG. 23, parallax minimum value, parallax maximum value, inter-camera distance, and additional correction coefficients of one intra-type slice and the two inter-type slices constituting the same PPS unit of the PPS #1 are the same as the parallax minimum value, the parallax maximum value, the inter-camera distance, and the additional correction coefficients, respectively, of the previous slice in the order of encoding. Therefore, the PPS #1 includes a transmission flag "0" indicating absence of transmission.

The encoding device 50 may transmit the information used for correction of the prediction image in accordance with any one of the methods of the first to third transmission methods of FIG. 21. The encoding device 50 may transmit identification information for identifying any one of the first to third transmission methods employed as the transmission method (for example, flag, ID) in such a manner that the identification information is included in the encoding bit stream. Further, the first to third transmission methods of FIG. 21 can be selected appropriately in view of the balance between the amount of data of the encoding bit stream and the processing load of the decoding in accordance with an application using the encoding bit stream.

In the present embodiment, the information used for correction of the prediction image is arranged in the slice header as the information about encoding, but the arrangement region of the information used for correction of the prediction image is not limited to the slice header as long as it is the region looked up during encoding. For example, the information used for correction of the prediction image can be arranged in an existing NAL (Network Abstraction Layer) unit such as a NAL unit of PPS and a new NAL unit such as a NAL unit of APS (Adaptation Parameter Set) suggested in the HEVC standard.

For example, when the correction coefficients and the additional correction coefficients are the same in multiple pictures, the same value is arranged in the NAL unit that can be applied to multiple pictures (for example, NAL unit of PPS), and the transmission efficiency can be improved. More specifically, in this case, the same correction coefficients and additional correction coefficients may be transmitted between multiple pictures, and therefore, like the case where they are arranged in the slice header, it is not necessary to transmit the correction coefficients and the additional correction coefficients for each slice.

Therefore, for example, when the color image is a color image having flash and fade effect, parameters such as the parallax minimum value, the parallax maximum value, and the inter-camera distance are likely not to change, and therefore, the correction coefficients and the additional correction coefficients are arranged in the NAL unit of the PPS, so that the transmission efficiency is improved.

When, for example, the correction coefficients and the additional correction coefficients are different for each picture, they are arranged in the slice header, and when they are the same in multiple pictures, they can be arranged in a layer above the slice header (for example, the NAL unit of the PPS).

Further, the parallax image may be an image including depthwise value representing the position in the depth direction of the subject of each pixel of the color image of the viewpoint corresponding to the parallax image. In this case, the parallax maximum value and the parallax minimum value are the maximum value and the minimum value, respectively, of world coordinate values of the positions in the depth direction that may occur in the multi-viewpoint parallax image.

The present technique can also be applied to encoding methods other than the HEVC method such as AVC, MVC (Multiview Video Coding) and the like.

<Second Embodiment>
[Explanation about Computer to which the Present Technique is Applied]

Subsequently, the above series of processing may be performed by either hardware or software. When the series of processing are performed by software, a program constituting the software is installed in a general-purpose computer and the like.

Figure 24:
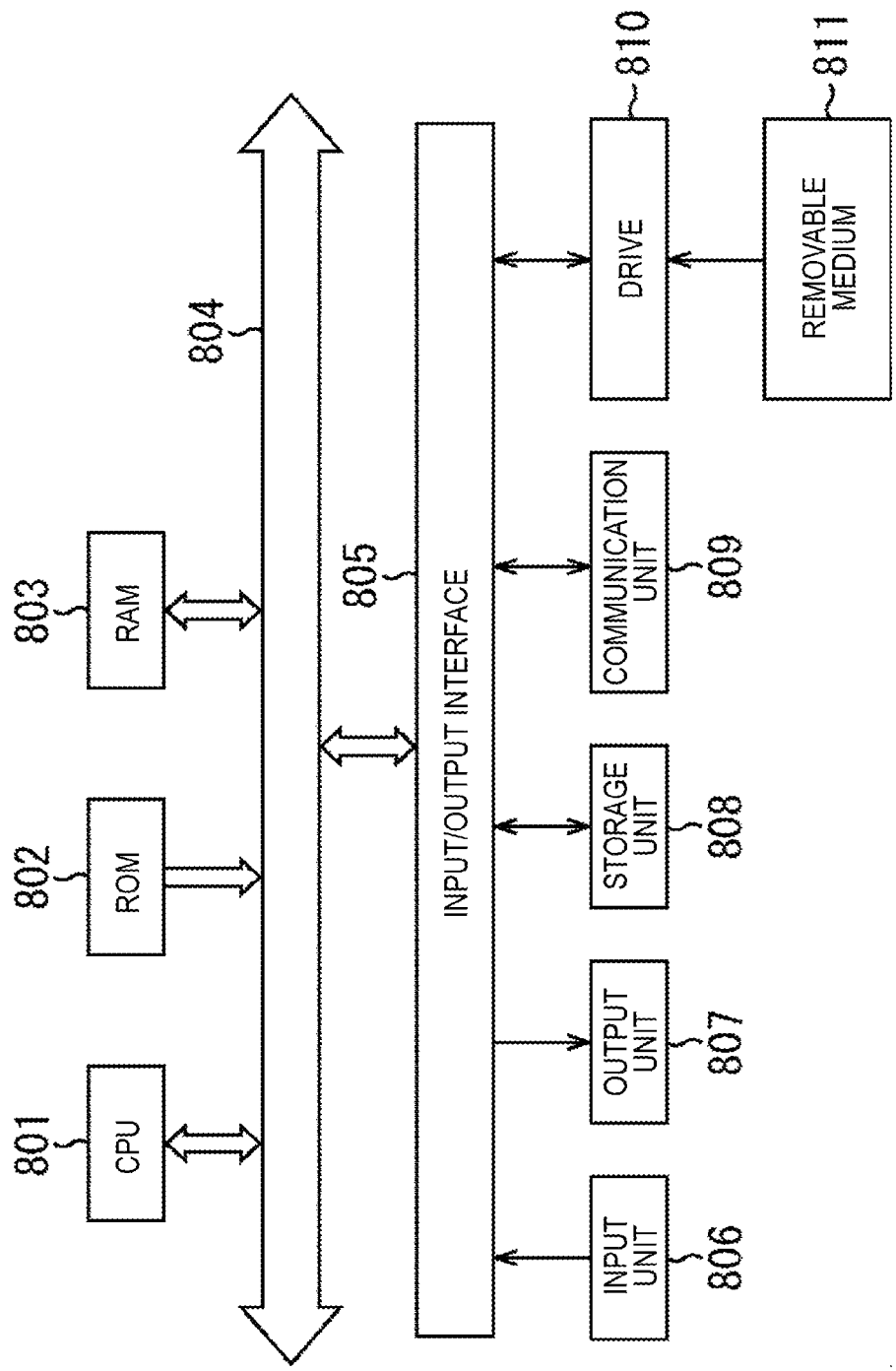
FIG. 24 is a block diagram illustrating an example of a configuration of an embodiment of a computer.

FIG. 24 is an exemplary configuration of an embodiment of a computer to which the program for executing the above series of processing is installed.

The program may be previously stored in a storage unit 808 and a ROM (Read Only Memory) 802 serving as recording media incorporated into the computer.

Alternatively, the program may be stored (recorded) to a removable medium 811. This removable medium 811 may be provided as so-called package software. In this case, examples of the removable medium 811 include, for example, a flexible disk, a CD-ROM (Compact Disc Read Only Memory), an MO (Magneto Optical) disk, a DVD (Digital Versatile Disc), a magnetic disk, a semiconductor memory, and the like.

The program can be installed to the computer from the removable medium 811 as described above using a drive 810. Alternatively, the program may be downloaded to the computer via a communication network or a broadcast network, and the program can be installed to the storage unit 808 provided therein. More specifically, the program can be, for example, transferred from a download site to the computer wirelessly via a man-made satellite for digital satellite broadcasting, or may be transferred to the computer via the wire, i.e., network such as a LAN (Local Area Network) and the Internet.

The computer has a CPU (Central Processing Unit) 801. The CPU 801 is connected to an input/output interface 805 via a bus 804.

When a user operates an input unit 806 to input a command to the CPU 801 via the input/output interface 805, the CPU 801 executes the program stored in the ROM 802 in response to the command. Alternatively, the CPU 801 loads the program stored in the storage unit 808 to a RAM (Random Access Memory) 803, and executes the program.

Thus, the CPU 801 performs the processing according to the above described flowcharts or the processing performed with the configurations in the block diagrams as described above. Then, as necessary, the CPU 801 outputs the processing result thereof from an output unit 807 via the input/output interface 805, transmits the processing result thereof from the communication unit 809, or records the processing result thereof to the storage unit 808, for example.

The input unit 806 is constituted by a keyboard, a mouse, a microphone, and the like. The output unit 807 is constituted by an LCD (Liquid Crystal Display), a speaker, and the like.

Here, in this specification, the processing performed according to the program by the computer may not be necessarily performed in time-series according to the order described in the flowcharts. In other words, the processing performed according to the program by the computer includes processing executed independently or in parallel (for example, processing performed with objects or parallel processing).

The program may be processed by one computer (processor), or may be processed by a plurality of computers as distributed processing. Further, the program may be transferred to a computer located far away and may be executed.

The present technique can be applied to an encoding device and a decoding device used for communication via a network medium such as a satellite broadcast, a cable TV (television), the Internet, and a portable telephone, or for processing on recording media such as optical, magnetic disks, and flash memories.

The above-described encoding device and decoding device can be applied to any given electronic devices. Hereinafter, an example thereof will be described.

<Third Embodiment>
[Example of Configuration of Television Device]

Figure 25:
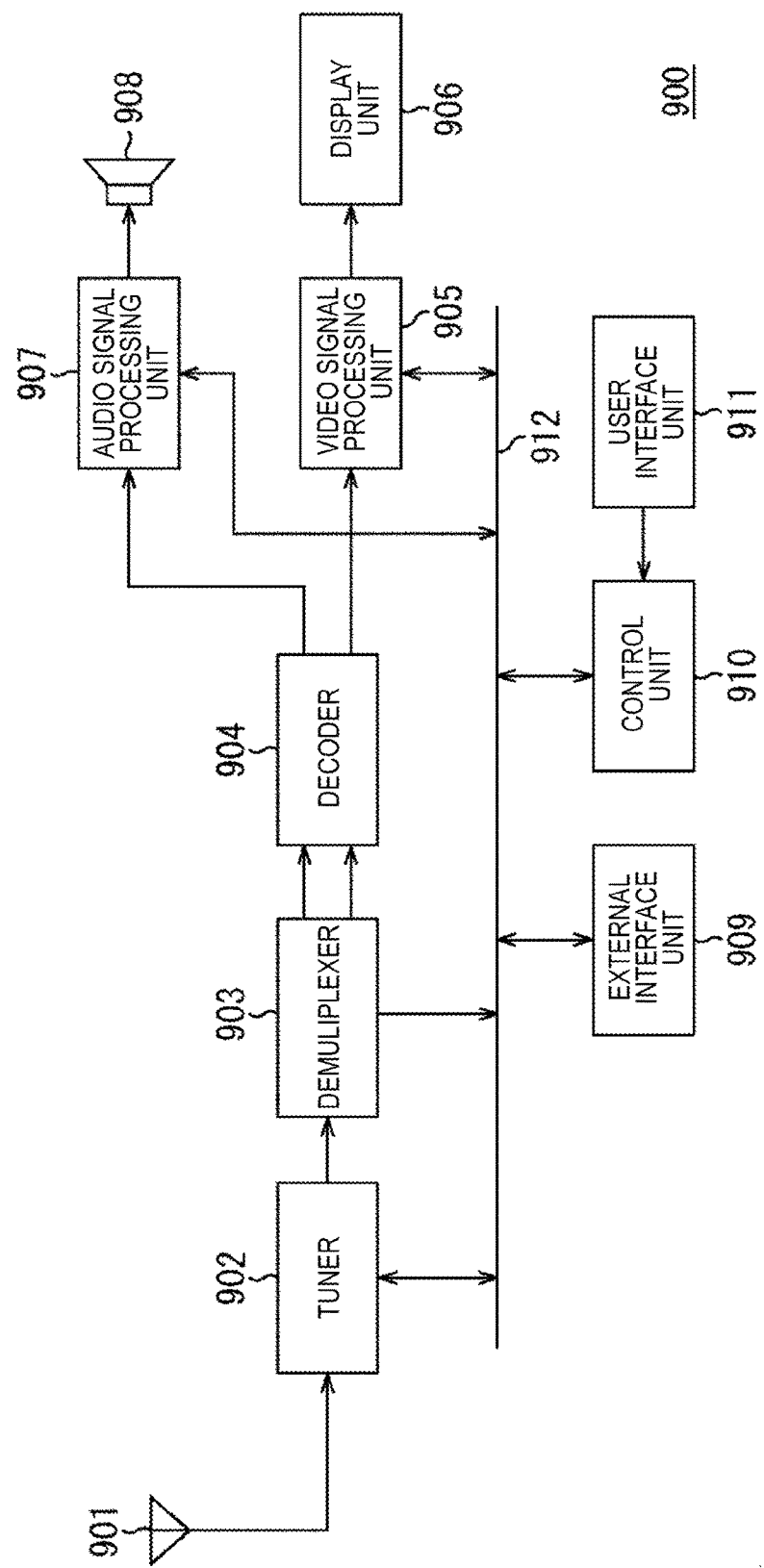
FIG. 25 is a diagram illustrating an example of a schematic configuration of a television device to which the present technique is applied.

FIG. 25 illustrates an example of a schematic configuration of a television device to which the present technique is applied. The television device 900 includes an antenna 901, a tuner 902, a demultiplexer 903, a decoder 904, a video signal processing unit 905, a display unit 906, an audio signal processing unit 907, a speaker 908, an external interface unit 909. Further, the television device 900 includes a control unit 910 and a user interface unit 911.

The tuner 902 tunes in to and demodulates a desired channel from among broadcast signals received by the antenna 901, and outputs the encoded bit stream thus obtained to the demultiplexer 903

The demultiplexer 903 extracts packets of video and audio of a TV program, which is a viewing target, from the encoded bit stream, and outputs the data of the extracted packets to the decoder 904. The demultiplexer 903 also provides packets of data such as an EPG (Electronic Program Guide) to the control unit 910. When scrambled, the demultiplexer and the like performs descrambling.

The decoder 904 performs decoding processing of packets, and outputs the video data generated by the decoding processing to the video signal processing unit 905, and the audio data to the audio signal processing unit 907.

The video signal processing unit 905 performs noise reduction and video processing according to user settings on the video data. The video signal processing unit 905 generates, e.g., video data of a TV program displayed on the display unit 906 and image data made by processing based on an application provided via a network. The video signal processing unit 905 generates video data for displaying a menu screen and the like for allowing selection of items, and overlays the video data on the video data of the TV program. The video signal processing unit 905 generates a driving signal based on the video data thus generated, and drives the display unit 906.

The display unit 906 displays, e.g., video of the TV program, by driving a display device (for example, liquid crystal display device and the like) based on the driving signal provided by the video signal processing unit 905.

The audio signal processing unit 907 performs predetermined processing such as noise reduction on the audio data, and D/A conversion processing and amplification processing of the audio data having been processed, and provides the data to the speaker 908, thus outputting audio.

The external interface unit 909 is an interface for connecting an external device and a network, and exchange data such as video data and audio data.

The control unit 910 is connected to the user interface unit 911. The user interface unit 911 is constituted by, e.g., operation switches and a remote control signal reception unit, and provides an operation signal according to user operation to the control unit 910.

The control unit 910 is constituted by a CPU (Central Processing Unit), a memory, and the like. The memory stores, e.g., programs executed by the CPU, various kinds of data required when processing is performed with the CPU, EPG data, and data obtained via a network. The programs stored in the memory is read and executed by the CPU with predetermined timing such as during activation of the television device 900. The CPU executes the program, thus controlling each unit so as to cause the television device 900 to operate in accordance with user operation.

The television device 900 is provided with the bus 912 for connecting the tuner 902, the demultiplexer 903, the video signal processing unit 905, the audio signal processing unit 907, the external interface unit 909 and the like to the control unit 910.

In the television device configured as described above, the functions of the decoding device (decoding method) of the present application are provided in the decoder 904. Therefore, the encoded data of the parallax image of which encoding efficiency has been improved by performing encoding using the information about the parallax image can be decoded.

<Fourth Embodiment>
[Example of Configuration of Portable Telephone]

Figure 26:
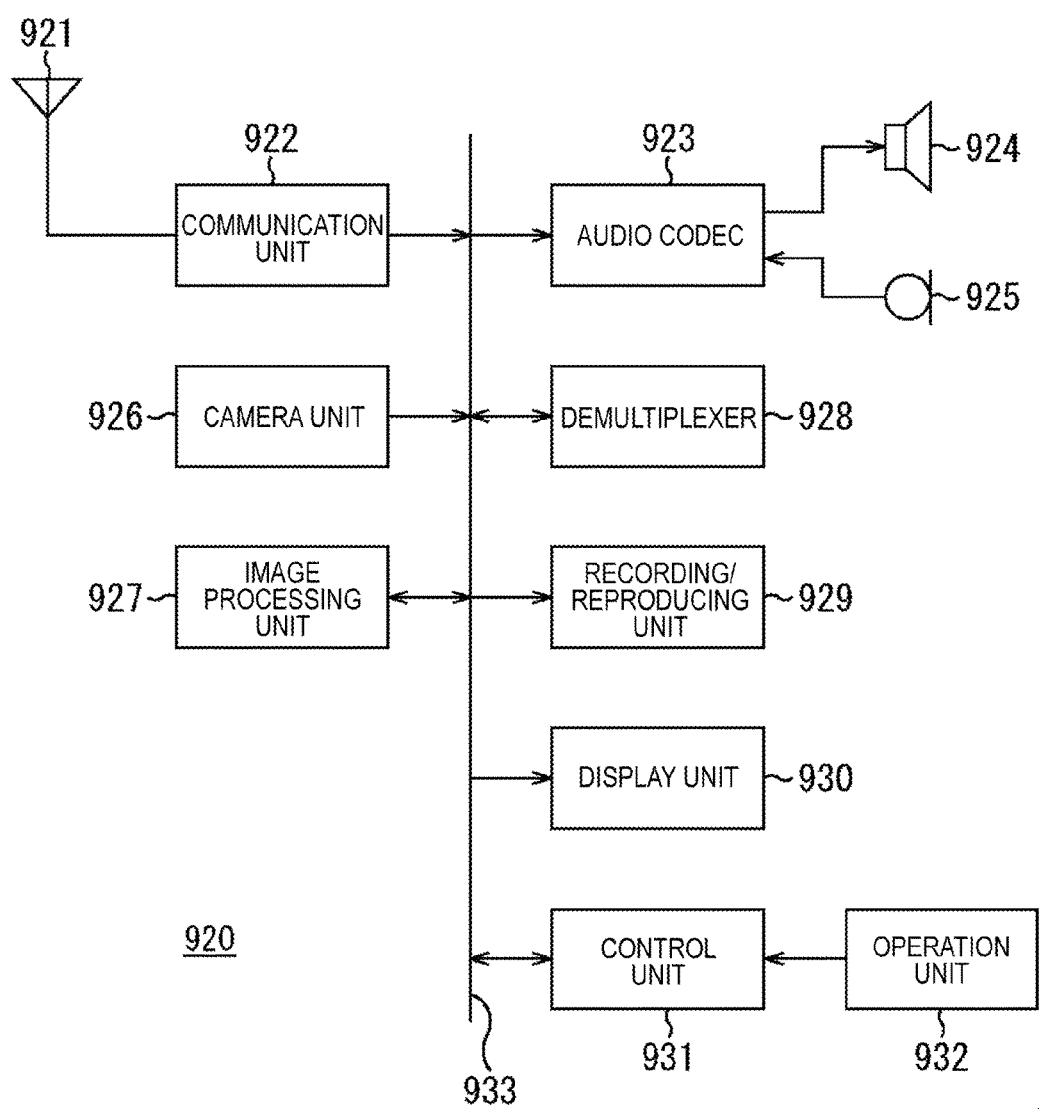
FIG. 26 is a diagram illustrating an example of a schematic configuration of a portable telephone to which the present technique is applied.

FIG. 26 illustrates an example of a schematic configuration of portable telephone to which the present technique is applied. The portable telephone 920 includes a communication unit 922, an audio codec 923, a camera unit 926, an image processing unit 927, a demultiplexing unit 928, a recording/reproducing unit 929, a display unit 930, and a control unit 931. They are connected with each other via a bus 933.

The communication unit 922 is connected to the antenna 921, and the audio codec 923 is connected to the speaker 924 and the microphone 925. Further, the control unit 931 is connected to the operation unit 932.

The portable telephone 920 performs various kinds of operation such as transmission and reception of audio signal, transmission and reception of e-mail and image data, image capturing, or recording of data, in various kinds of modes such as audio phone call mode and data communication mode.

In the audio phone call mode, an analog audio signal generated by the microphone 925 is, e.g., converted into audio data and compressed by the audio codec 923, and is provided to the communication unit 922. The communication unit 922 performs, e.g., modulation processing and frequency conversion processing on the audio data, and generates a transmission signal. The communication unit 922 provides the transmission signal to the antenna 921, and transmits the transmission signal to a base station, not shown. The communication unit 922 performs, e.g., amplification, frequency conversion processing and demodulation processing on the reception signal received by the antenna 921, and provides the obtained audio data to the audio codec 923. The audio codec 923 performs, e.g., data extension of the audio data and conversion into analog audio signal, and outputs the data to the speaker 924.

When a mail is transmitted in the data communication mode, the control unit 931 receives character data which are input by operation with the operation unit 932, and displays the input characters on the display unit 930. The control unit 931 also generates mail data based on, e.g., the user instruction with the operation unit 932, and provides the mail data to the communication unit 922. The communication unit 922 performs, e.g., modulation processing and frequency conversion processing on mail data, and transmits the obtained transmission signal via the antenna 921. The communication unit 922 performs, e.g., amplification, frequency conversion processing and modulation processing on the reception signal received by the antenna 921, and restores the mail data. The mail data are provided to the display unit 930, and the contents of the mail are displayed.

The portable telephone 920 can also store the received mail data to a storage medium using the recording/reproducing unit 929. The storage medium is any given rewritable storage medium. For example, the storage medium may be a semiconductor memory such as RAM and internal flash memory, a hard disk, or a removable medium such as a magnetic disk, a magneto optical disk, an optical disk, a USB memory, or a memory card.

When image data are transmitted in the data communication mode, the image data generated by the camera unit 926 are provided to the image processing unit 927. The image processing unit 927 performs encoding processing of the image data and generates encoded data.

The demultiplexing unit 928 multiplexes the encoded data generated by the image processing unit 927 and the audio data provided from the audio codec 923 in accordance with predetermined method, and provides the data to the communication unit 922. The communication unit 922 performs, e.g., modulation processing and frequency conversion processing on the multiplexed data, and transmits the obtained transmission signal via the antenna 921. The communication unit 922 performs, e.g., amplification, frequency conversion processing and amplification processing on the reception signal received by the antenna 921, and restores the multiplexed data. The multiplexed data are provided to the demultiplexing unit 928. The demultiplexing unit 928 separates the multiplexed data, and provides the encoded data to the image processing unit 927, and the audio data to the audio codec 923. The image processing unit 927 performs decoding processing of the encoded data and generates image data. The image data are provided to the display unit 930, and the received image is displayed. The audio codec 923 converts the audio data into analog audio signal, and provides the analog audio signal to the speaker 924 so as to output the received audio.

In the portable telephone configured as described above, the image processing unit 927 is provided with a function of an encoding device and a decoding device (encoding method and decoding method) of the present application. Therefore, the encoding efficiency of the parallax image can be improved by using information about the parallax image. In addition, the encoded data of the parallax image of which encoding efficiency has been improved by performing encoding using the information about the parallax image can be decoded.

<Fifth Embodiment>
[Example of Configuration of Recording/Reproducing Device]

Figure 27:
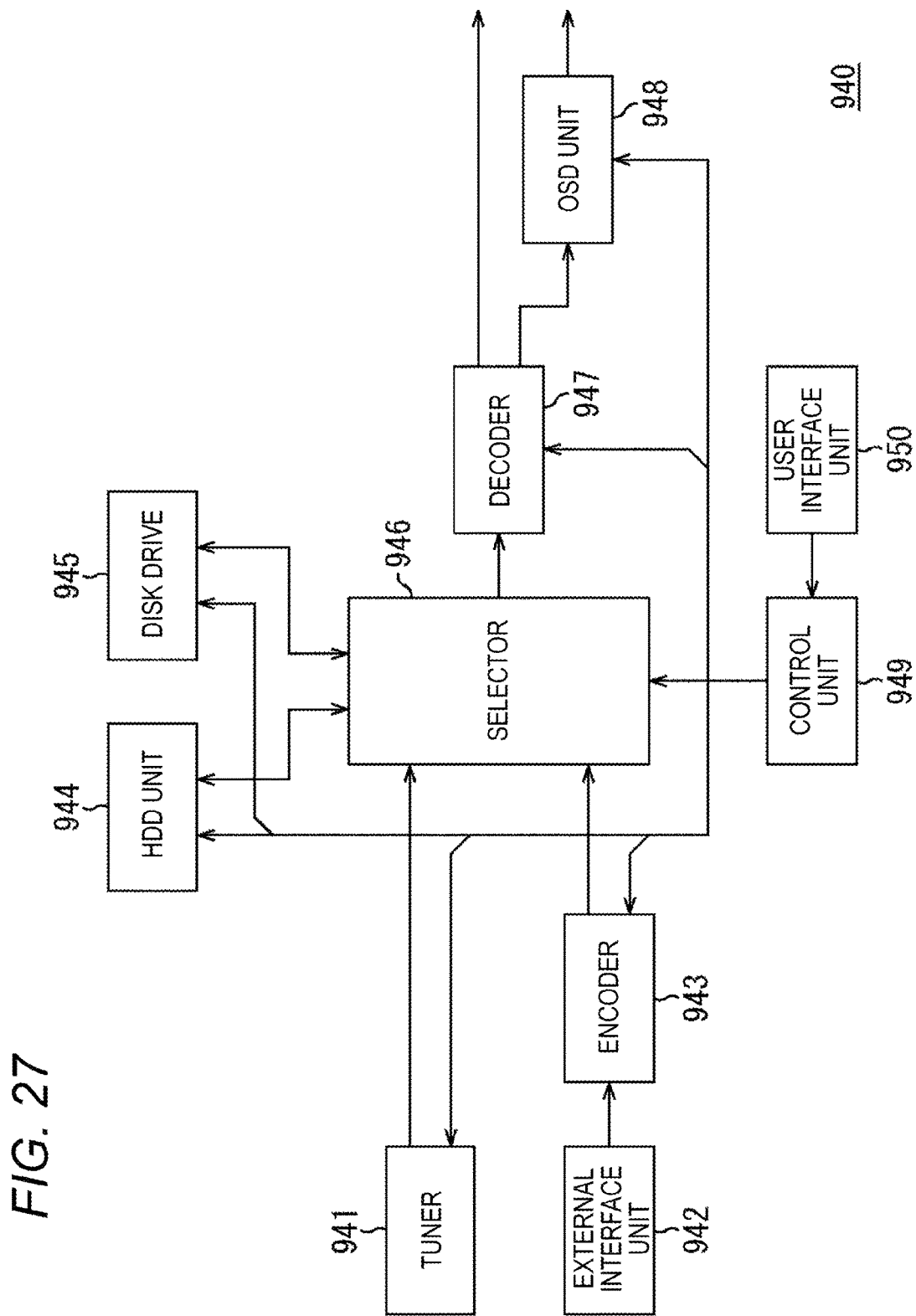
FIG. 27 is a diagram illustrating an example of a schematic configuration of a recording/reproducing device to which the present technique is applied.

FIG. 27 illustrates an example of a schematic configuration of a recording/reproducing device to which the present technique is applied. For example, a recording/reproducing device 940 records audio data and video data of received broadcasting program to a recording medium, and provides a user with the recorded data with timing according to user's instruction. For example, the recording/reproducing device 940 can obtain the audio data and the video data from another device, and can record them to the recording medium. Further, the recording/reproducing device 940 decodes and outputs the audio data and the video data recorded in the recording medium, thus allowing image display and audio output with the monitor device and the like.

The recording/reproducing device 940 includes a tuner 941, an external interface unit 942, an encoder 943, an HDD (Hard Disk Drive) unit 944, a disk drive 945, a selector 946, a decoder 947, an OSD (On-Screen Display) unit 948, a control unit 949, and a user interface unit 950.

The tuner 941 tunes in to a desired channel from broadcasting signals received by an antenna, not shown. The tuner 941 outputs, to the selector 946, an encoded bit stream obtained by demodulating the reception signal of the desired channel.

The external interface unit 942 may be constituted by, for example, any one of an IEEE1394 interface, a network interface unit, a USB interface, a flash memory interface, and the like. The external interface unit 942 is an interface for connecting to an external device, a network, a memory card, and the like, and receives data such as the video data, the audio data, and the like thus recorded.

The encoder 943 performs encoding according to a predetermined method when the video data and the audio data provided from the external interface unit 942 are not encoded, and outputs the encoded bit stream to the selector 946.

The HDD unit 944 records the content data such as video and audio, other data of various kinds of programs, and the like to an internal hard disk, and reads them from the hard disk during play back and the like.

The disk drive 945 records and reproduces the signal to/from an optical disk loaded. For example, the optical disk is a DVD disk (DVD-Video, DVD-RAM, DVD-R, DVD-RW, DVD+R, DVD+RW and the like), a Blu-ray disk, and the like.

During recording of video and audio, the selector 946 selects an encoded bit stream from any one of the tuner 941 and the encoder 943, and provides it to any one of the HDD unit 944 and the disk drive 945. During reproduction of video and audio, the selector 946 provides the decoder 947 with the encoded bit stream which is output from the HDD unit 944 or the disk drive 945.

The decoder 947 performs decoding processing of the encoded bit stream. The decoder 947 performs decoding processing, thereby providing the generated video data to the OSD unit 948. The decoder 947 performs decoding processing, thereby outputting the generated audio data.

The OSD unit 948 generates video data for displaying a menu screen and the like such as item selection, and overlays and outputs them on the video data which are output from the decoder 947.

The control unit 949 is connected to the user interface unit 950. The user interface unit 950 is constituted by, e.g., operation switches and a remote control signal reception unit, and provides an operation signal according to user operation to the control unit 949.

The control unit 949 is constituted by a CPU, a memory, and the like. The memory stores, e.g., programs executed by the CPU, various kinds of data required when processing is performed with the CPU. The programs stored in the memory is read and executed by the CPU with predetermined timing such as during activation of the recording/reproducing device 940. The CPU executes the program, thus controlling each unit so as to cause the recording/reproducing device 940 to operate in accordance with user operation.

In the recording/reproducing device configured as described above, the decoder 947 is provided with a function of a decoding device (decoding method) of the present application. Therefore, the encoded data of the parallax image of which encoding efficiency has been improved by performing encoding using the information about the parallax image can be decoded.

<Sixth Embodiment>
[Example of Configuration of Image-Capturing Device]

Figure 28:
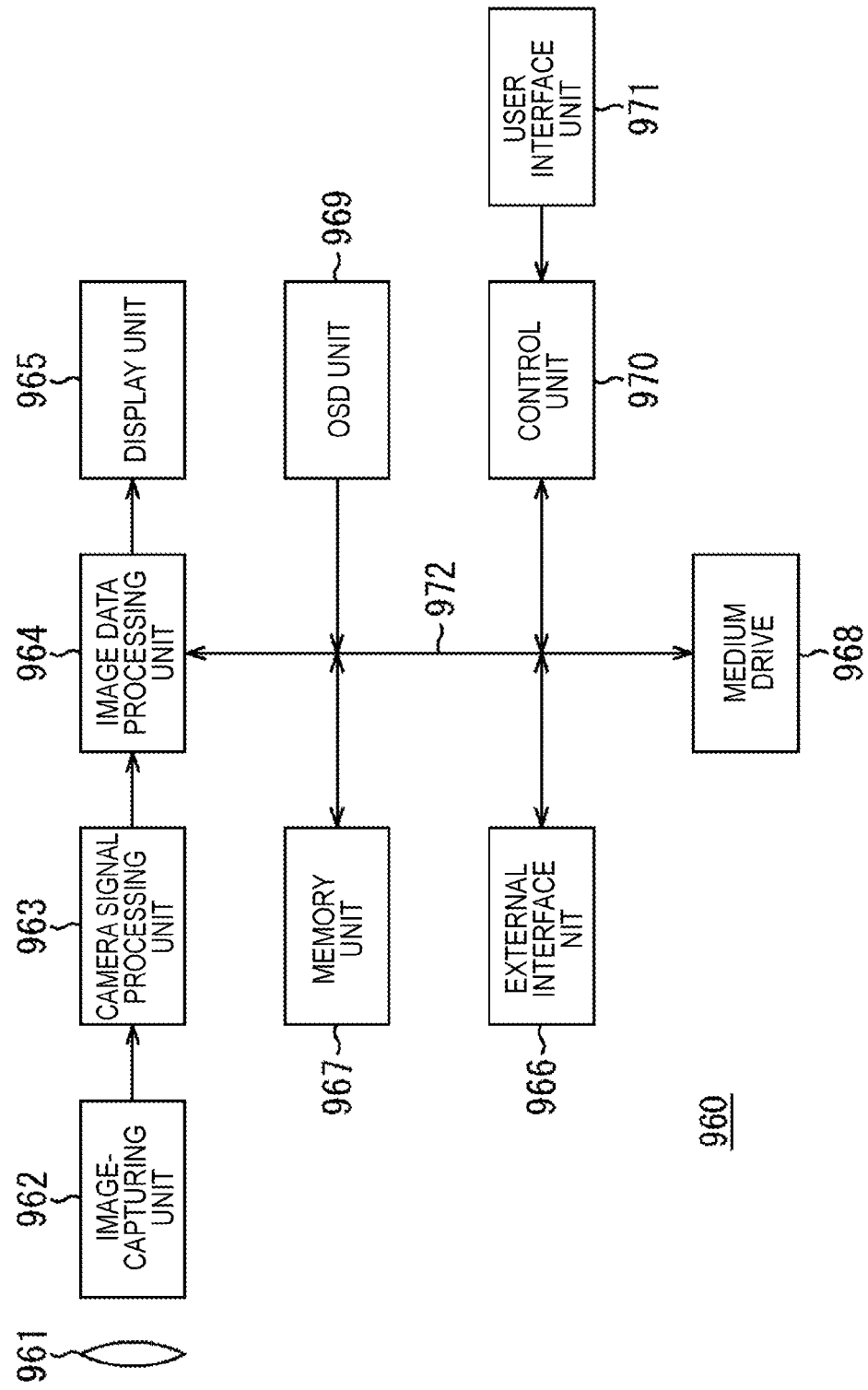
FIG. 28 is a diagram illustrating an example of a schematic configuration of an image-capturing device to which the present technique is applied.

FIG. 28 illustrates an example of a schematic configuration of an image-capturing device to which the present technique is applied. An image-capturing device 960 captures an image of a subject, displays the image of the subject on the display unit, and records the image data to a recording medium.

The image-capturing device 960 includes an optical block 961, an image-capturing unit 962, a camera signal processing unit 963, an image data processing unit 964, a display unit 965, an external interface unit 966, a memory unit 967, a medium drive 968, an OSD unit 969, and a control unit 970. The control unit 970 is connected to a user interface unit 971. Further, the image data processing unit 964, the external interface unit 966, the memory unit 967, the medium drive 968, the OSD unit 969, the control unit 970, and the like are connected via the bus 972.

The optical block 961 is constituted by, e.g., a focus lens and a diaphragm mechanism. The optical block 961 forms an optical image of a subject on the imaging surface of the image-capturing unit 962. The image-capturing unit 962 includes a CCD or a CMOS image sensor, and generates an electric signal according to an optical image by photoelectric conversion, and provides the electric signal to the camera signal processing unit 963.

The camera signal processing unit 963 performs various kinds of camera signal processing such as knee correction, gamma correction, and color correction on the electric signal provided by the image-capturing unit 962. The camera signal processing unit 963 provides the image data processing unit 964 with image data having been subjected to the camera signal processing.

The image data processing unit 964 performs encoding processing on the image data provided from the camera signal processing unit 963. The image data processing unit 964 provides the external interface unit 966 and the medium drive 968 with the encoded data generated by performing the encoding processing. The image data processing unit 964 performs decoding processing on the encoded data provided by the external interface unit 966 and the medium drive 968.

The image data processing unit 964 provides the display unit 965 with the image data generated by performing the decoding processing. The image data processing unit 964 performs processing for providing the display unit 965 with the image data provided from the camera signal processing unit 963, and overlays the display data obtained from the OSD unit 969 on the image data and provides the data to the display unit 965.

The OSD unit 969 generates display data such as a menu screen and icons including symbols, characters, or figures, and outputs the display data to the image data processing unit 964.

The external interface unit 966 is constituted by, for example, a USB input/output terminal, and when image is to be printed, it is connected to a printer. The external interface unit 966 is also connected to a drive as necessary, and removable medium such as a magnetic disk, an optical disk is loaded as necessary, and a computer program read therefrom is installed as necessary. Further, the external interface unit 966 includes a network interface connected to a predetermined network such as a LAN or the Internet. For example, the control unit 970 reads the encoded data from the memory unit 967 in accordance with a command from the user interface unit 971, and can provide the data to another device connected via the network from the external interface unit 966. The control unit 970 obtains, via the external interface unit 966, the encoded data and the image data provided from another device via the network, and can provide the data to the image data processing unit 964, for example.

The recording medium driven the medium drive 968 may be any given removable medium which can be read and written, such as a magnetic disk, an optical magnetic disk, an optical disk, or a semiconductor memory. The recording medium may be of any type as a removable medium, and may be a tape device, or a disk, or a memory card. It is to be understood that it may be a non-contact IC card and the like.

The medium drive 968 and the recording medium may be integrated, and like, for example, an internal hard disk drive and an SSD (Solid State Drive), the medium drive 968 and the recording medium may be configured by a non-movable storage medium.

The control unit 970 is constituted by a CPU, a memory, and the like. The memory stores, e.g., programs executed by the CPU, various kinds of data required when processing is performed with the CPU. The programs stored in the memory is read and executed by the CPU with predetermined timing such as during activation of the image-capturing device 960. The CPU executes the program, thus controlling each unit so as to cause the image-capturing device 960 to operate in accordance with user operation.

In the image-capturing device configured as described above, the image data processing unit 964 is provided with a function of an encoding device and a decoding device (encoding method and decoding method) of the present application. Therefore, the encoding efficiency of the parallax image can be improved by using information about the parallax image. In addition, the encoded data of the parallax image of which encoding efficiency has been improved by performing encoding using the information about the parallax image can be decoded More specifically, the embodiments of the present technique is not limited to the embodiments explained above, and may be changed in various manners as long as it is within the gist of the present technique.

It should be noted that the present technique may be configured as follows.

(1)

An encoding device including:

a correction unit configured to correct a prediction image of a parallax image of a reference viewpoint using information about the parallax image of the reference viewpoint;

an encoding unit configured to encode the parallax image of the reference viewpoint using the prediction image corrected by the correction unit; and a transmission unit configured to transmit the parallax image of the reference viewpoint encoded by the encoding unit and the information about the parallax image of the reference viewpoint.

(2)

The encoding device according to (1), wherein the information about the parallax image of the reference viewpoint includes viewpoint generation information which is information used to generate a color image of a viewpoint different from the reference viewpoint using the parallax image of the reference viewpoint and the color image of the reference viewpoint, and the transmission unit transmits the viewpoint generation information as an encoding parameter used to encode the parallax image of the reference viewpoint.

(3)

The encoding device according to (2), wherein the correction unit corrects the prediction image using the correction coefficient used to correct the prediction image based on the viewpoint generation information, and the transmission unit transmits a correction coefficient as the encoding parameter.

(4)

The encoding device according to (2), wherein the information about the parallax image of the reference viewpoint includes image-capturing position information representing an image-capturing position in a depth direction of an image-capturing unit for capturing the color image of the reference viewpoint, the correction unit corrects the prediction image using the correction coefficient used to correct the prediction image based on the image-capturing position information and the viewpoint generation information, and the transmission unit transmits the correction coefficient as the encoding parameter.

(5)

The encoding device according to (3) or (4), wherein the correction unit sets the correction coefficient.

(6)

The encoding device according to any one of (1) to (5), wherein the encoding unit encodes the parallax image of the reference viewpoint in a unit having a hierarchical structure.

(7)

The encoding device according to any one of (1) to (6) further including a prediction image generation unit for generating the prediction image of the parallax image of the reference viewpoint.

(8)

An encoding method for an encoding device including:

a correction step of correcting a prediction image of a parallax image of a reference viewpoint using information about the parallax image of the reference viewpoint;

an encoding step of encoding the parallax image of the reference viewpoint using the prediction image corrected by processing in the correction step; and a transmission step of transmitting the parallax image of the reference viewpoint encoded by processing in the encoding step and the information about the parallax image of the reference viewpoint.

(9)

A decoding device including:

a reception unit configured to receive a parallax image of a reference viewpoint encoded using a prediction image of a parallax image of the reference viewpoint corrected using information about the parallax image of the reference viewpoint and the information about the parallax image of the reference viewpoint;

a correction unit configured to correct a prediction image of the parallax image of the reference viewpoint using the information about the parallax image of the reference viewpoint received by the reception unit; and a decoding unit configured to decode the encoded parallax image of the reference viewpoint received by the reception unit using the prediction image corrected by the correction unit.

(10)

The decoding device according to (9) further including a color image generation unit configured to generate a color image of a viewpoint different from the reference viewpoint using the parallax image of the reference viewpoint decoded by the decoding unit and the color image of the reference viewpoint, wherein the information about the parallax image of the reference viewpoint includes viewpoint generation information which is information used to generate a color image of a viewpoint different from the reference viewpoint using the parallax image of the reference viewpoint and the color image of the reference viewpoint, the reception unit receives the viewpoint generation information transmitted as the encoding parameter used to decode the parallax image of the reference viewpoint encoded, and the color image generation unit generates the color image of the view point different from the reference viewpoint, using the parallax image of the reference viewpoint decoded by the decoding unit, the color image of the reference viewpoint, and the viewpoint generation information received by the reception unit.

(11)

The decoding unit according to (10), wherein the reception unit receives a correction coefficient used to correct the prediction image during encoding, which is transmitted as the encoding parameter, the correction coefficient is generated based on the viewpoint generation information, and the correction unit corrects the prediction image using the correction coefficient received by the reception unit.

(12)

The decoding unit according to (10), wherein the information about the parallax image of the reference viewpoint includes image-capturing position information representing an image-capturing position in a depth direction of an image-capturing unit for capturing the color image of the reference viewpoint, the reception unit receives the correction coefficient used to correct the prediction image during encoding, which is transmitted as the encoding parameter, and the correction unit corrects the prediction image using the correction coefficient received by the reception unit and the viewpoint generation information.

(13)

The device according to (12), wherein the correction coefficient is set based on the viewpoint generation information.

(14)

The decoding device according to any one of (9) to (13), wherein the parallax image of the reference viewpoint is encoded in a unit having a hierarchical structure.

(15)

The decoding device according to any one of (9) to (14) further including a prediction image generation unit for generating the prediction image of the parallax image of the reference viewpoint.

(16)

A decoding method for a decoding device including:

a reception step of receiving a parallax image of reference viewpoint encoded using a prediction image of a parallax image of the reference viewpoint corrected using information about the parallax image of the reference viewpoint and the information about the parallax image of the reference viewpoint;

a correction step of correcting a prediction image of the parallax image of the reference viewpoint using the information about the parallax image of the reference viewpoint received by processing in the reception step; and a decoding step of decoding the encoded parallax image of the reference viewpoint received by processing in the reception step using the prediction image corrected by processing in the correction step.

REFERENCE SIGNS LIST 50 encoding device, 64 SPS encoding unit, 123 arithmetic operation unit, 134 motion prediction/compensation unit, 135 correction unit, 150 decoding device, 152 viewpoint compositing unit, 171 SPS decoding unit, 255 addition unit, 262 motion compensation unit, 263 correction unit

The invention claimed is:

1. An encoding device comprising:
a processing device and a memory encoded with computer-executable instructions that, when executed by the processing device, implement:
a correction unit configured to correct a prediction image of a parallax image of a reference viewpoint using information about the parallax image of the reference viewpoint, including a parallax maximum value, a parallax minimum value and an inter-camera distance;
an encoding unit configured to encode the parallax image of the reference viewpoint using the prediction image corrected by the correction unit and to perform differential encoding of the parallax maximum value, the parallax minimum value and the inter-camera distance; and
a transmission unit configured to transmit the parallax image of the reference viewpoint encoded by the encoding unit and to transmit the differential-encoded parallax maximum value, the differential-encoded parallax minimum value and the differential-encoded inter-camera distance with the encoded parallax image of the reference viewpoint.

2. The encoding device according to claim 1, wherein the information about the parallax image of the reference viewpoint includes viewpoint generation information which is information used to generate a color image of a viewpoint different from the reference viewpoint using the parallax image of the reference viewpoint and the color image of the reference viewpoint, and the transmission unit transmits the viewpoint generation information as an encoding parameter used to encode the parallax image of the reference viewpoint.

3. The encoding device according to claim 2, wherein the correction unit corrects the prediction image using the correction coefficient used to correct the prediction image based on the viewpoint generation information, and the transmission unit transmits a correction coefficient as the encoding parameter.

4. The encoding device according to claim 2, wherein the information about the parallax image of the reference viewpoint includes image-capturing position information representing an image-capturing position in a depth direction of an image-capturing unit for capturing the color image of the reference viewpoint, the correction unit corrects the prediction image using the correction coefficient used to correct the prediction image based on the image-capturing position information and the viewpoint generation information, and the transmission unit transmits the correction coefficient as the encoding parameter.

5. The encoding device according to claim 4, wherein the correction unit sets the correction coefficient.

6. The encoding device according to claim 5, wherein the encoding unit encodes the parallax image of the reference viewpoint in a unit having a hierarchical structure.

7. The encoding device according to claim 1 further comprising a prediction image generation unit for generating the prediction image of the parallax image of the reference viewpoint.

8. An encoding method for an encoding device comprising:

correcting a prediction image of a parallax image of a reference viewpoint using information about the parallax image of the reference viewpoint, including a parallax maximum value, a parallax minimum value and an inter-camera distance;

encoding the parallax image of the reference viewpoint using the prediction image corrected by processing in the correction step and differential encoding the parallax maximum value, the parallax minimum value and the inter-camera distance; and transmitting the parallax image of the reference viewpoint encoded by processing in the encoding step and transmitting the differential-encoded parallax maximum value, the differential-encoded parallax minimum value and the differential-encoded inter-camera distance with the encoded parallax image of the reference viewpoint.

* * * * *